US008442686B2

(12) United States Patent
Saito et al.

(10) Patent No.: US 8,442,686 B2
(45) Date of Patent: May 14, 2013

(54) ARTICULATED ARM ROBOT, CONTROL METHOD AND CONTROL PROGRAM

(75) Inventors: Fuminori Saito, Nagoya (JP); Toru Isobe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/643,278

(22) PCT Filed: Jan. 31, 2011

(86) PCT No.: PCT/JP2011/000523
§ 371 (c)(1),
(2), (4) Date: Oct. 24, 2012

(87) PCT Pub. No.: WO2012/104895
PCT Pub. Date: Aug. 9, 2012

(65) Prior Publication Data
US 2013/0041509 A1    Feb. 14, 2013

(51) Int. Cl.
*G05B 15/00* (2006.01)
*G05B 19/00* (2006.01)
*G05B 19/18* (2006.01)

(52) U.S. Cl.
USPC ........... 700/261; 700/245; 700/250; 700/256; 700/260; 901/15

(58) Field of Classification Search .................. None
See application file for complete search history.

(56) References Cited

U.S. PATENT DOCUMENTS

| 5,737,500 | A | * | 4/1998 | Seraji et al. | 700/251 |
|---|---|---|---|---|---|
| 5,784,542 | A | * | 7/1998 | Ohm et al. | 700/260 |
| 5,811,951 | A | * | 9/1998 | Young | 318/568.2 |
| 5,876,325 | A | * | 3/1999 | Mizuno et al. | 600/102 |
| 6,933,695 | B2 | * | 8/2005 | Blumenkranz | 318/568.11 |
| 7,035,716 | B2 | * | 4/2006 | Harris et al. | 700/245 |
| 7,331,750 | B2 | * | 2/2008 | Merz et al. | 414/735 |
| 7,685,902 | B2 | * | 3/2010 | Kock et al. | 74/490.06 |

(Continued)

FOREIGN PATENT DOCUMENTS

| JP | 61-252084 A | 11/1986 |
|---|---|---|
| JP | 2-212085 A | 8/1990 |

(Continued)

*Primary Examiner* — Khoi Tran
*Assistant Examiner* — Bao Long T Nguyen
(74) *Attorney, Agent, or Firm* — Kenyon & Kenyon LLP

(57) ABSTRACT

An articulated arm robot includes a support part capable of extending and contracting upward and downward, a first arm part with one end joined to the support part through a first joint to be rotatable about a yaw axis and having a second joint rotatable about a roll axis between both ends, a second arm part with one end joined to the other end of the first arm part through a third joint to be rotatable about the yaw axis or a pitch axis, an end effector part joined to the other end of the second arm part through a fourth joint to be rotatable about the yaw axis or the pitch axis, and drivers that respectively cause the first to fourth joints to rotate and the support part to extend and contract, and a controller that performs drive control of the drivers of the first to fourth joints by switching the arm between a SCARA mode where the first, second and third arm parts rotate only in a horizontal plane and a perpendicular mode where the second and third arm parts rotate only in a vertical plane.

16 Claims, 22 Drawing Sheets

U.S. PATENT DOCUMENTS

| | | | |
|---|---|---|---|
| 2006/0201275 A1* | 9/2006 | Ono | 74/490.01 |
| 2009/0003975 A1* | 1/2009 | Kuduvalli et al. | 414/146 |
| 2010/0050806 A1* | 3/2010 | Ono et al. | 74/490.02 |
| 2010/0236351 A1* | 9/2010 | Ono | 74/490.01 |

FOREIGN PATENT DOCUMENTS

| | | | |
|---|---|---|---|
| JP | 7-148680 A | 6/1995 |
| JP | 8-090463 A | 4/1996 |
| JP | 9-085658 A | 3/1997 |
| JP | 9-265313 A | 10/1997 |
| JP | 10-225881 A | 8/1998 |
| JP | 10-225891 A | 8/1998 |
| JP | 2000-193063 A | 7/2000 |
| JP | 2001-121467 A | 5/2001 |
| JP | 2006-082170 A | 3/2006 |
| JP | 2008-073790 A | 4/2008 |
| JP | 2008-272874 A | 11/2008 |
| JP | 2009-078312 A | 4/2009 |

* cited by examiner

ARTICULATED ARM ROBOT, CONTROL METHOD AND CONTROL PROGRAM

This is a 371 national phase application of PCT/JP2011/000523 filed 31 Jan. 2011, the contents of which are incorporated herein by reference.

TECHNICAL FIELD

The present invention relates to an articulated arm robot having a plurality of joints, a control method, and a control program.

BACKGROUND ART

In general, an arm robot that works together with human is required to have high safety, and, in order to safely operate the arm robot, it is desirable to sufficiently reduce its driving force and assure the safety. However, to achieve both a wider range of motion and a heavier work weight capacity using a typical vertical articulated arm with an arm axis structure similar to a human arm, a large driving force is required especially at a joint of the arm base where a moment length is long. This results in the arm structure which is not very safe and not low power consumption.

On the other hand, assembly work or the like is performed using an industrial robot such as a SCARA (Selective Compliance Assembly Robot Arm) robot combining a horizontal articulated axis and a vertical axis. Further, an articulated robot in which a plurality of stages of offset rotational joints are mounted between a robot main body and an end effector, each offset rotational joint including a rotation control structure mounted on the plane tilted with respect to a link axis line between a driving link and a driven link, the driven link having an offset rotational axis line tilted with respect to the link axis line, is known (see Patent Literature 1, for example).

CITATION LIST

Patent Literature

[PTL 1] Japanese Unexamined Patent Application Publication No. H10-225881

SUMMARY OF INVENTION

Technical Problem

However, although the above mentioned SCARA robot has an advantage that the weight of the work or arm itself does not act on a pivot axis and therefore its driving force can be suppressed to be low, it has a disadvantage that the upper and lower range of motion of the arm is limited and narrowed.

Further, although the articulated robot disclosed in Patent Literature 1 has a wider range of motion, there is a concern that the structure is complicated.

The present invention has been accomplished to solve the above problems and a primary object of the present invention is thus to provide an articulated arm robot capable of driving an arm with a small driving force and movable over a wide range in a simple structure, a control method, and a control program.

Solution to Problem

One aspect of the present invention to attain the above object is an articulated arm robot including a support part capable of extending and contracting upward and downward, a first arm part with one end joined to the support part through a first joint to be rotatable about a yaw axis and having a second joint rotatable about a roll axis between both ends, a second arm part with one end joined to the other end of the first arm part through a third joint to be rotatable about the yaw axis or a pitch axis, an end effector part joined to the other end of the second arm part through a fourth joint to be rotatable about the yaw axis or the pitch axis, and drivers that respectively cause the first to fourth joints to rotate and the support part to extend and contract, the articulated arm robot including a controller that performs drive control of the drivers of the first to fourth joints by switching the arm between a SCARA mode where the first, second and third arm parts rotate only in a horizontal plane and a perpendicular mode where the second and third arm parts rotate only in a vertical plane.

In this aspect, the controller may control the arm to switch between the SCARA mode where rotation axes of the first, third and fourth joints are in a vertical direction and the perpendicular mode where rotation axes of the third and fourth joints are in a horizontal direction by controlling the drivers to rotate the second joint about the roll axis. It is thus possible to drive the arm with a small driving force in the SCARA mode and move the arm over a wide range in the perpendicular mode.

In this aspect, the controller may control rotation of the first, third and fourth joints by controlling the drivers to minimize a torque imposed on the roll axis of the second joint in the SCARA mode. It is thus possible to employ the second driver with a small driving force and achieve the improved safety and lower power consumption of the arm.

In this aspect, the controller may control rotation of the first, third and fourth joints by controlling the drivers to minimize a moment force acting on the second joint by a center of gravity position from the second joint to the end effector part.

In this aspect, the center of gravity position may include a work weight.

In this aspect, the controller may control rotation of the third and fourth joints by controlling the drivers to minimize a torque imposed on the pitch axis of the third joint in the perpendicular mode. It is thus possible to employ the third driver with a small driving force and achieve the improved safety and lower power consumption of the arm.

In this aspect, the controller may control rotation of the third and fourth joints by controlling the drivers to minimize a moment force around the pitch axis of the third joint by a center of gravity position from the third joint to the end effector part.

In this aspect, the center of gravity position may include a work weight.

In this aspect, in a low posture where the third joint is higher than the fifth joint, the controller may control rotation of the third and fourth joints so that the fourth joint is placed lower than a line connecting the third joint and the fifth joint, and in a high posture where the third joint is lower than the fifth joint, the controller may control rotation of the third and fourth joints so that the fourth joint is placed higher than the line connecting the third joint and the fifth joint.

In this aspect, the articulated arm robot may further include a third arm part with one end joined to said the other end of the second arm part through a fourth joint to be rotatable about the yaw axis or the pitch axis, and the end effector part may be joined to the other end of the third arm part through a fifth joint to be rotatable about the roll axis, the pitch axis and the yaw axis.

In this aspect, the controller may switch the arm to the perpendicular mode and control rotation of the third and fourth joints so that the second arm part, the third atm part and the end effector part are housed. It is thus possible to compactly house the arm.

In this aspect, an irreversible transmission mechanism that transmits an output torque from the driver side to the roll axis side of the second joint and does not transmit a torque from the roll axis side of the second joint to the driver side may be mounted on the second joint. It is thus possible to employ the second driver with a small driving force and achieve the safe and low power consumption arm structure.

In this aspect, a weight compensation mechanism that supports gravity of the first joint to the end effector part may be mounted on the support part. It is thus possible to employ the sixth driver with a small driving force and achieve the improved safety and lower power consumption of the arm.

In this aspect, the articulated arm robot may further include a movable body joined to the support part and being movable. It is thus possible to move the arm over a wider range.

On the other hand, one aspect of the present invention to attain the above object may be a control method of an articulated arm robot including a support part capable of extending and contracting upward and downward, a first arm part with one end joined to the support part through a first joint to be rotatable about a yaw axis and having a second joint rotatable about a roll axis between both ends, a second arm part with one end joined to the other end of the first arm part through a third joint to be rotatable about the yaw axis or a pitch axis, an end effector part joined to the other end of the second arm part through a fourth joint to be rotatable about the yaw axis or the pitch axis, and drivers that respectively cause the first to fourth joints to rotate and the support part to extend and contract, the method performing drive control of the drivers of the first to fourth joints by switching the arm between a SCARA mode where the first, second and third arm parts rotate only in a horizontal plane and a perpendicular mode where the second and third arm parts rotate only in a vertical plane.

Further, one aspect of the present invention to attain the above object may be a control program of an articulated arm robot including a support part capable of extending and contracting upward and downward, a first arm part with one end joined to the support part through a first joint to be rotatable about a yaw axis and having a second joint rotatable about a roll axis between both ends, a second arm part with one end joined to the other end of the first arm part through a third joint to be rotatable about the yaw axis or a pitch axis, an end effector part joined to the other end of the second arm part through a fourth joint to be rotatable about the yaw axis or the pitch axis, and drivers that respectively cause the first to fourth joints to rotate and the support part to extend and contract, the program causing a computer to execute processing of performing drive control of the drivers of the first to fourth joints by switching the arm between a SCARA mode where the first, second and third arm parts rotate only in a horizontal plane and a perpendicular mode where the second and third arm parts rotate only in a vertical plane.

Advantageous Effects of Invention

According to the present invention, it is possible to provide an articulated arm robot capable of driving an arm with a small driving force and movable over a wide range in a simple structure, a control method, and a control program.

DESCRIPTION OF EMBODIMENTS

First Embodiment

Figure 1:
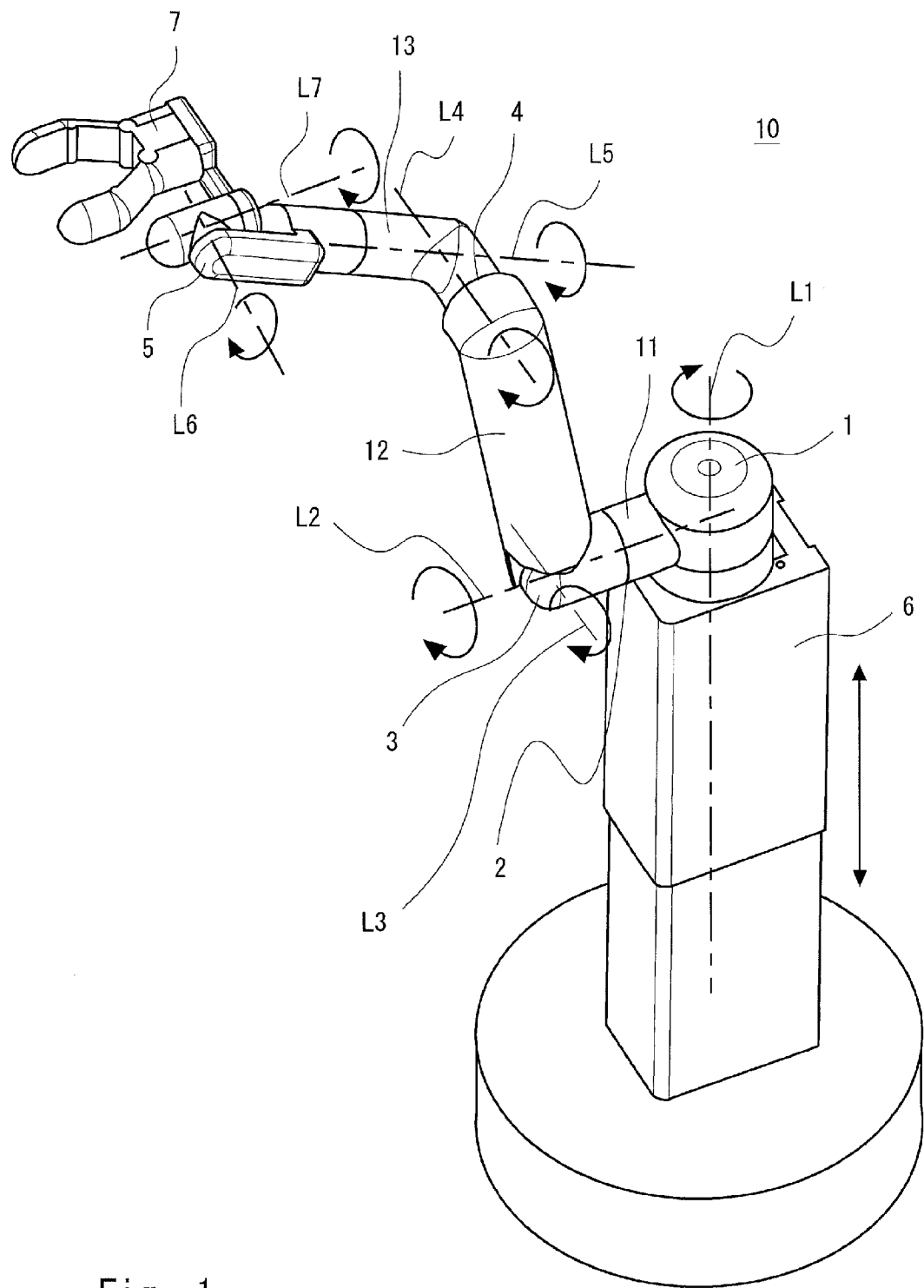
FIG. 1 is a perspective view showing a schematic structure of an articulated arm robot according to a first embodiment of the present invention.
Figure 2:
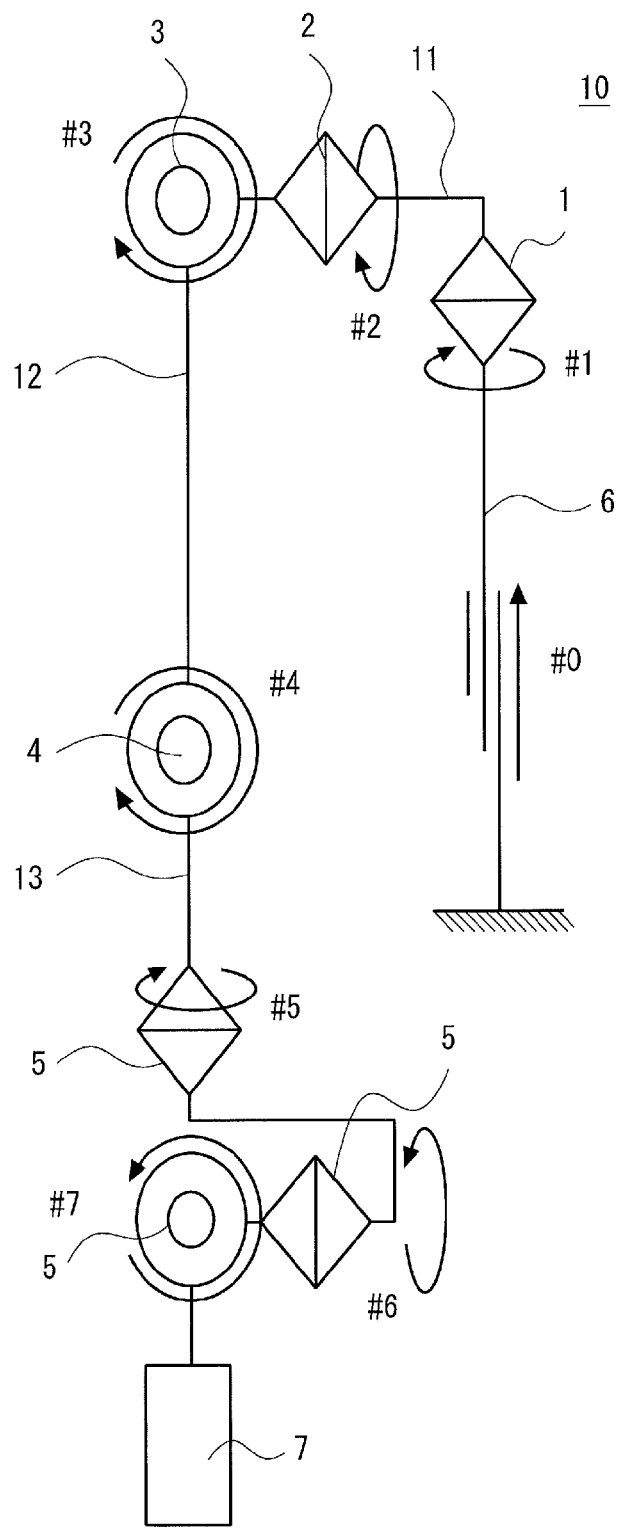
FIG. 2 is a block diagram showing a schematic arm structure of the articulated arm robot according to the first embodiment of the present invention.
Figure 3:
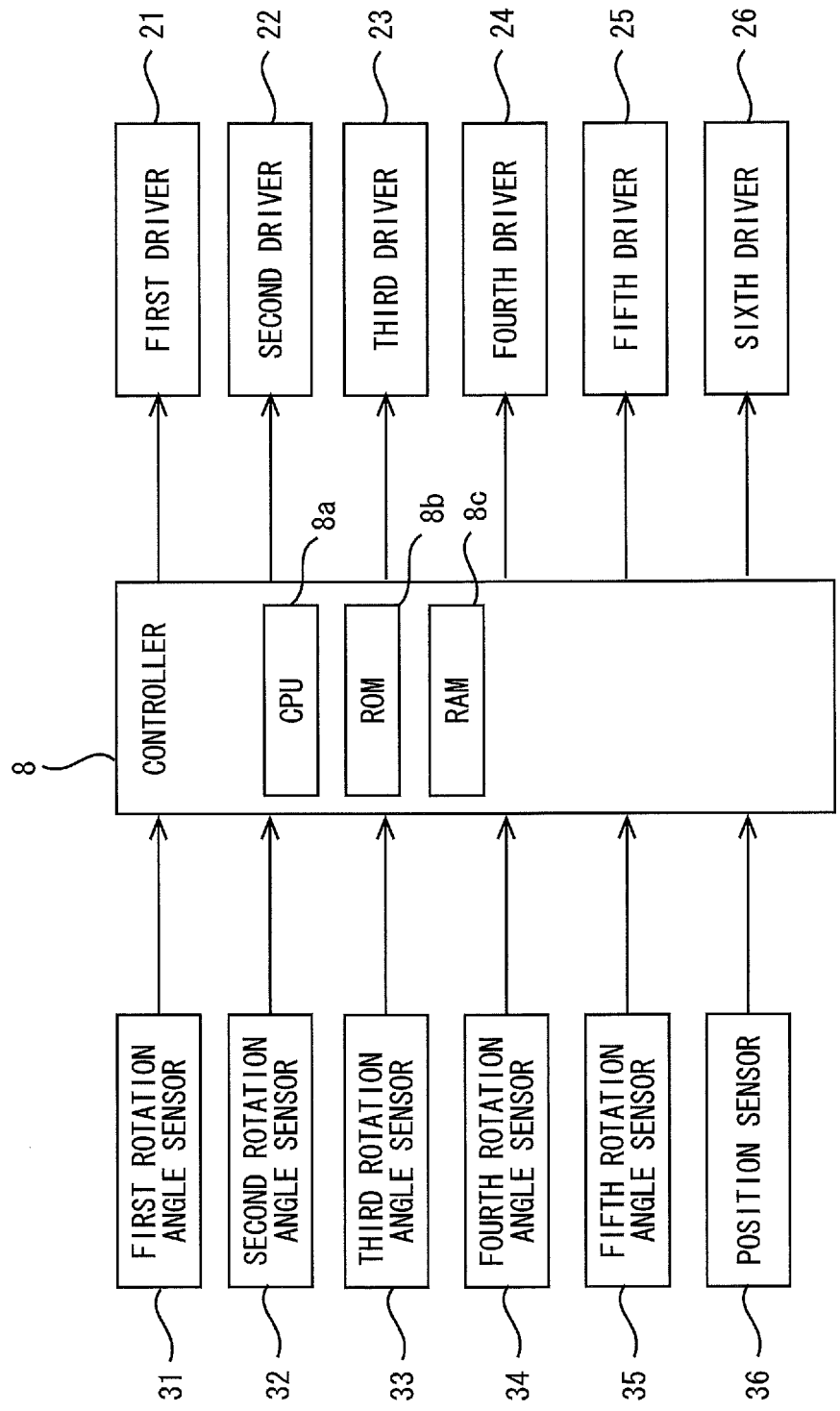
FIG. 3 is a block diagram showing a schematic system configuration of the articulated arm robot according to the first embodiment of the present invention.

Embodiments of the present invention are described hereinafter with reference to the drawings. FIG. 1 is a perspective view showing a schematic structure of an articulated arm robot according to a first embodiment of the present invention. FIG. 2 is a block diagram showing a schematic arm structure of the articulated arm robot according to the first embodiment. FIG. 3 is a block diagram showing a schematic system configuration of the articulated arm robot according to the first embodiment.

An articulated arm robot 10 according to the first embodiment includes a support part 6 fixed to a given position, a first arm part 11 with one end joined to the top end of the support part 6 through a first joint 1, a second arm part 12 with one end joined to the other end of the first arm part 11 through a third joint 3, a third arm part 13 with one end joined to the other end of the second arm part 12 through a fourth joint 4, an end effector part 7 joined to the other end of the third arm part 13 through a fifth joint 5, first to sixth drivers 21, 22, 23, 24, 25 and 26 that respectively cause the first to fifth joints 1, 2, 3, 4 and 5 to rotate and the support part 6 to extend and contract, and a controller 8 that controls driving of the first to sixth drivers 21, 22, 23, 24, 25 and 26.

The support part 6 (vertical elevation axis) 6 has an extensible mechanism capable of upward and downward extension and contraction, which allows the first joint 1 joined to its top to move upward and downward and thereby allows the entire arm to move upward and downward. One end of the first arm part 11 is joined to the support part 6 through the first joint 1 so that it is rotatable about the yaw axis (shoulder axis 1, horizontal pivot axis) L1. Further, the second joint 2 which is rotatable about the roll axis (shoulder axis 2) L2 is mounted between the both ends of the first arm part 11.

One end of the second arm part 12 is joined to the other end of the first arm part 11 through the third joint 3 so that it is rotatable about the yaw axis or the pitch axis (shoulder axis 3) L3. One end of the third arm part 13 is joined to the other end of the second arm part 12 through the fourth joint 4 so that it is rotatable about the yaw axis or the pitch axis (elbow axis) L4. The end effector part 7 is joined to the other end of the third arm part 13 through the fifth joint 5 so that it is rotatable about the roll axis (wrist axis 1) L5, the pitch axis (wrist axis 2) L6, and the yaw axis (wrist axis 3) L7.

Note that the roll axis L5, the pitch axis L6 and the yaw axis L7 at the fifth joint 5 are arranged to form three orthogonal axes. An analytic solution of the inverse kinematics of the arm can be thereby obtained, which makes control easy. The end effector part 7 is configured as a gripper having a plurality of fingers and capable of gripping an object, for example; however, it is not limited thereto, and any structure is applicable.

The first to fifth drivers 21, 22, 23, 24 and 25 are actuators such as servomotors incorporated into the first to the fifth joints 1, 2, 3, 4 and 5, for example, and rotationally drive the first to fifth joints 1, 2, 3, 4 and 5, respectively, through a speed reduction mechanism or the like. The sixth driver 26 is a hydraulic or electric actuator incorporated into the support part 6, for example, and causes the support part 6 to extend and contract upward and downward using the extensible mechanism. The first to sixth drivers 21, 22, 23, 24, 25 and 26 are connected to the controller 8 through a drive circuit or the like, and rotationally drive the first to fifth joints 1, 2, 3, 4 and 5 or cause the support part 6 to extend and contract according to a control signal transmitted from the controller 8.

First to fifth rotation angle sensors 31, 32, 33, 34 and 35 capable of measuring the rotation angles of the first to the fifth joints 1, 2, 3, 4 and 5 are respectively mounted on the first to fifth joints 1, 2, 3, 4 and 5. The first to fifth rotation angle sensors 31, 32, 33, 34 and 35 are potentiometers, for example, and respectively connected to the controller 8 and output the measured rotation angles of the first to the fifth joints 1, 2, 3, 4 and 5 to the controller 8.

Note that the first rotation angle sensor 31 can measure the rotation angle about the yaw axis L1 (#1) of the first joint 1, the second rotation angle sensor 32 can measure the rotation angle about the roll axis L2 (#2) of the second joint 2, the third rotation angle sensor 33 can measure the rotation angle about the yaw axis or the pitch axis L3 (#3) of the third joint 3, the fourth rotation angle sensor 34 can measure the rotation angle about the yaw axis or the pitch axis L4 (#4) of the fourth joint 4, and the fifth rotation angle sensor 35 can measure the rotation angle about the roll axis L5 (#5), the pitch axis L6 (#6) and the yaw axis L7 (#7) of the fifth joint 5, respectively.

Further, a position sensor 36 that measures the height position (#0) of the support part 6 is mounted on the support part 6. The position sensor 36 is connected to the controller 8 and outputs the measured height position of the support part 6 to the controller 8.

The controller 8 performs feedback control or the like so that the first to fifth joints 1, 2, 3, 4 and 5 have target rotation angles based on the rotation angles from the first to fifth rotation angle sensors 31, 32, 33, 34 and 35 and so that the support part 6 is at a target height position based on the height position from the position sensor 36.

Note that the controller 8 is configured as hardware including a microcomputer composed of a CPU (Central Processing Unit) 8a that performs control, operation and the like, a control program that is executed by the CPU 8a, a ROM (Read Only Memory) 8b that stores an operation program and the like, a RAM (Random Access Memory) 8c that stores processing data and the like.

Figure 4:
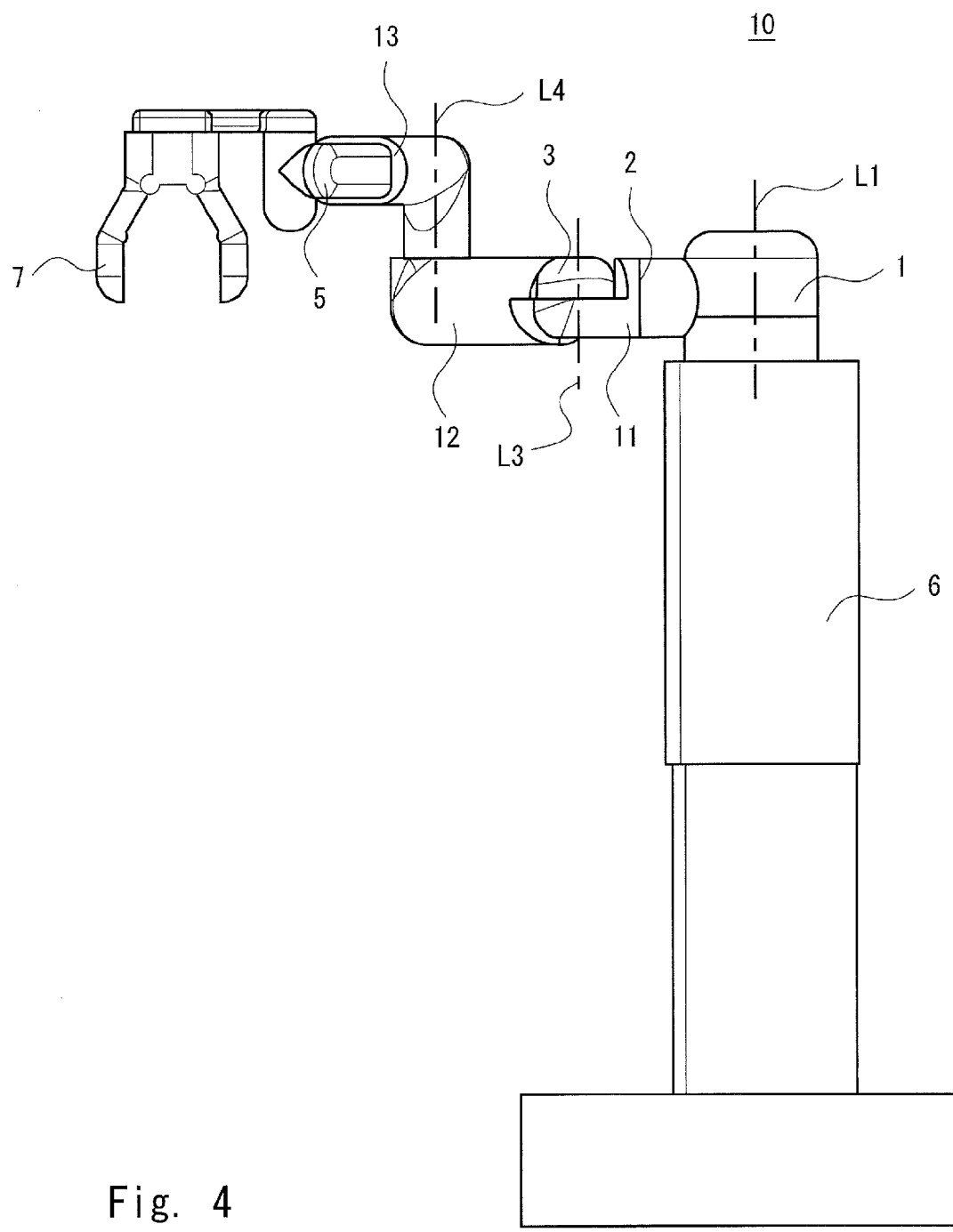
FIG. 4 is a side view showing an example of the state of the articulated arm robot in the SCARA mode.
Figure 5:
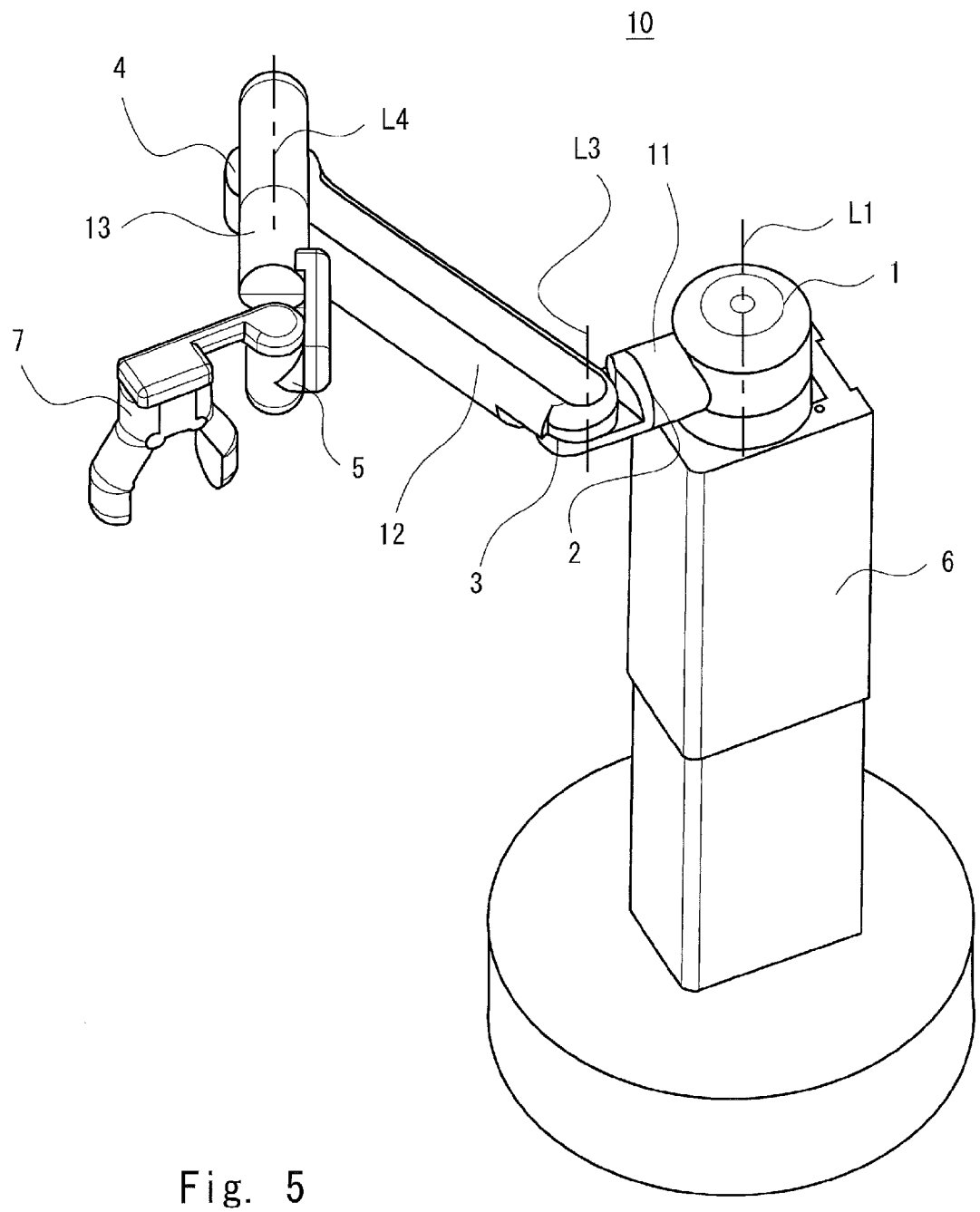
FIG. 5 is a perspective view showing an example of the state of the articulated arm robot in the SCARA mode.

The controller 8 performs drive control of the first to fifth drivers 21, 22, 23, 24 and 25 of the first to fifth joints 1, 2, 3, 4 and 5 by switching the arm between the SCARA mode (FIGS. 4 and 5) in which the first, third and fourth joints 1, 3 and 4 rotate only in the horizontal direction and the perpendicular mode (FIGS. 6 and 7) in which the third and fourth joints 3 and 4 rotate only in the perpendicular direction.

The roll axis L2 of the second joint 2 has a function as a mode switch axis for switching between the SCARA mode and the perpendicular mode. The controller 8 controls the second driver 22 to rotate the second joint 2 about the roll axis L2 to thereby switch between the SCARA mode in which the first, third and fourth rotation axes L1, L3 and L4 of the first, third and fourth joints 1, 3 and 4 are in the vertical direction and the perpendicular mode in which the third and fourth rotation axes L3 and L4 of the third and fourth joints 3 and 4 are in the horizontal direction. The SCARA mode and the perpendicular mode are described hereinafter in detail.
(SCARA Mode)

The controller 8 rotates the second joint 2 about the roll axis L2 and switches the arm to the SCARA mode (FIGS. 4 and 5), and then controls the horizontal rotation of the first, third and fourth joints 1, 3 and 4 through the first, third and fourth drivers 21, 23 and 24 to thereby control the arm posture. This effectively reduces the load imposed on the joint axis at the base (especially, the roll axis L2 of the second joint 2) during grasping and handling of a heavy load, for example.

In the SCARA mode, the load caused by the gravity of the arm or work acts on the support part 6, the second joint 2 and the fifth joint 5. On the other hand, the moment length of the fifth joint 5 is short, and the moment force is small, thereby the driving force of the fifth driver 25 that drives the fifth joint 5 can be suppressed to be low. Further, the driving force of the second joint 2 can be suppressed to be low as described later, and, on the other hand, a large driving force is required for the extension and contraction of the support part 6; however, as for the driving force of the support part 6, a large extension and contraction force can be generated with a small driving force by use of a weight compensation mechanism 41 as described later. In this manner, the controller 8 can drive the arm with a small driving force and low power consumption by switching the arm to the SCARA mode.

Figure 8:
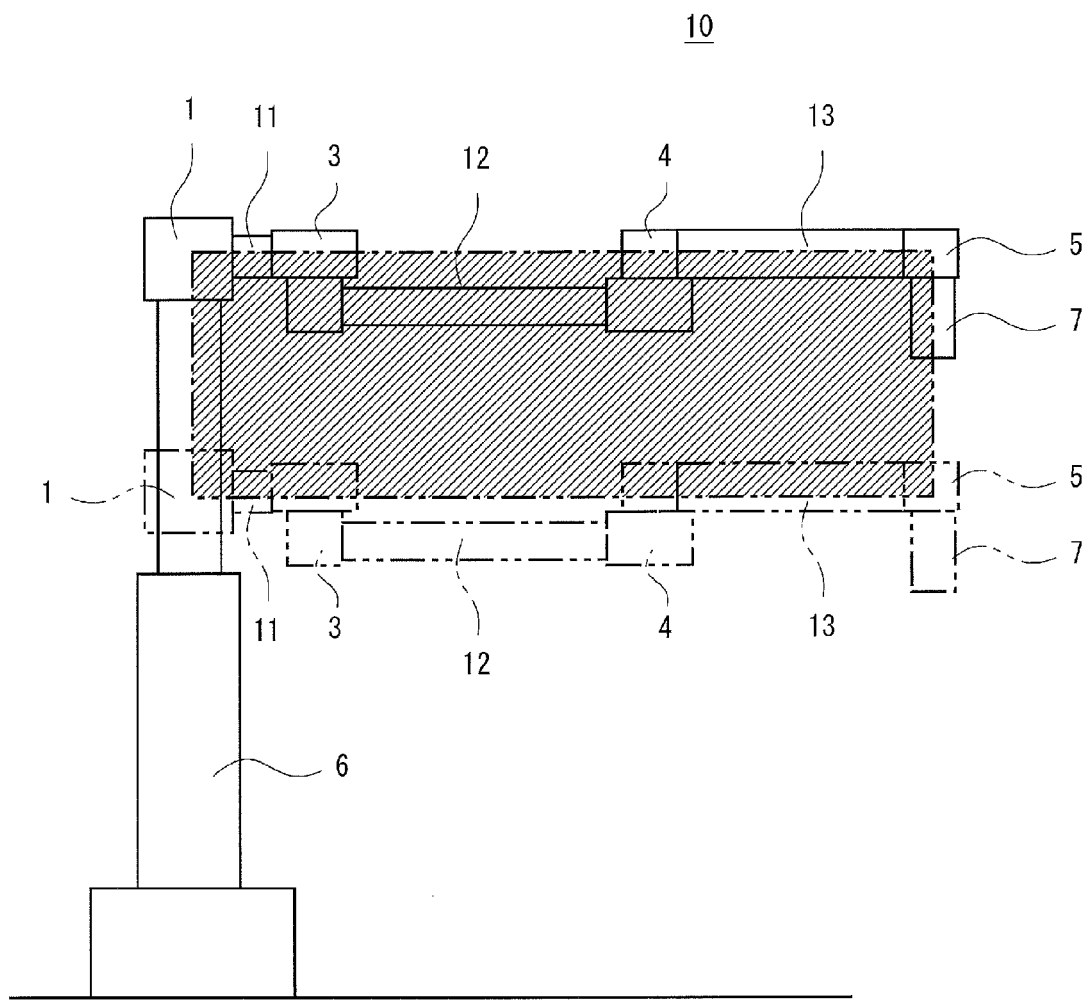
FIG. 8 is a view showing an example of the range of motion of the arm in the SCARA mode.

Note that, in the SCARA mode, the position in the vertical direction of the fifth joint 5 is determined only by the height position of the support part 6, and therefore the upper and lower range of motion of the fifth joint 5 is determined by the upper and lower extensible range of the support part 6 (FIG. 8). It is therefore desirable to perform work at an intermediate height such as desk work, for example.
(Perpendicular Mode)

Figure 6:
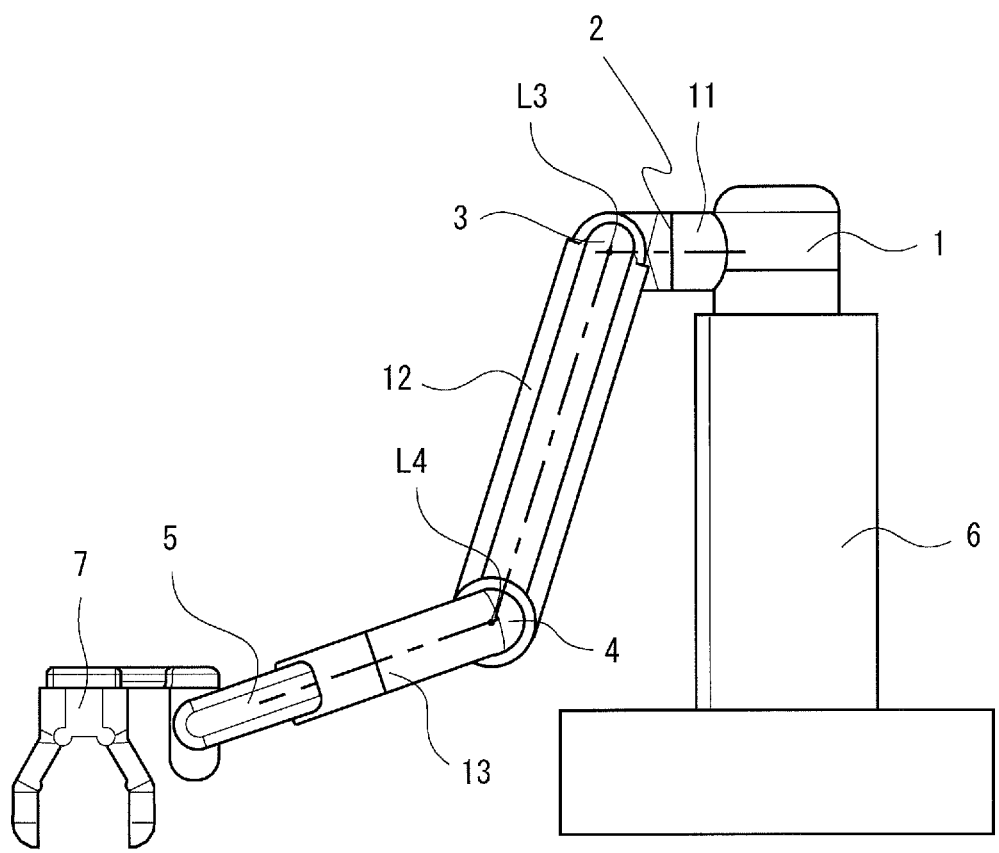
FIG. 6 is a side view showing an example of the state of the articulated arm robot in the perpendicular mode.
Figure 7:
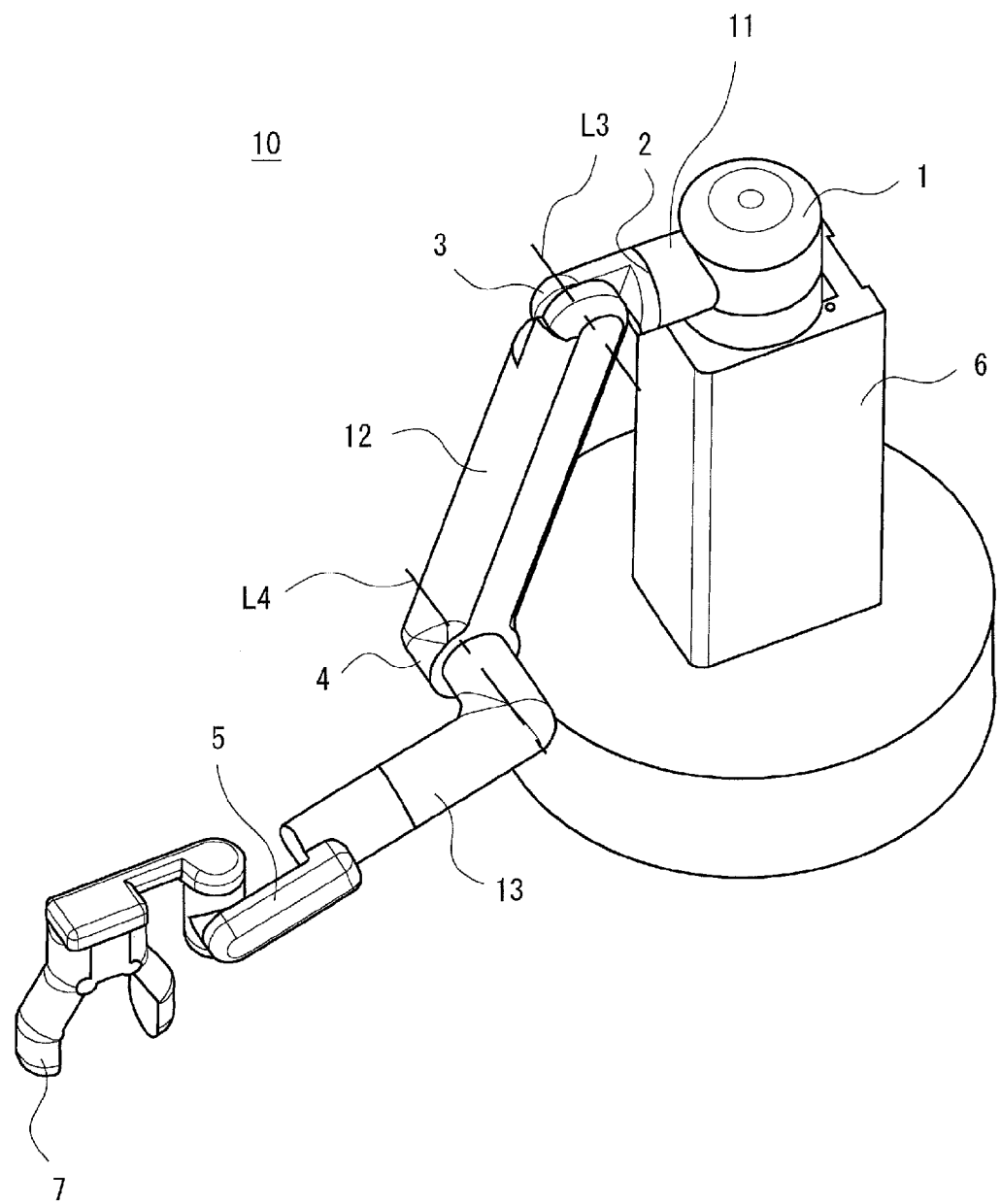
FIG. 7 is a perspective view showing an example of the state of the articulated arm robot in the perpendicular mode.

The controller 8 rotates the second joint 2 about the roll axis L2 and switches the arm to the perpendicular mode (FIGS. 6 and 7). Then, the controller 8 controls the perpendicular rotation of the third and fourth joints 3 and 4 through the third and fourth drivers 23 and 24 to thereby control the arm posture. This enables the arm operation over a wide range of motion such as grasping and handling an object at a low or high position, for example.

Figure 9:
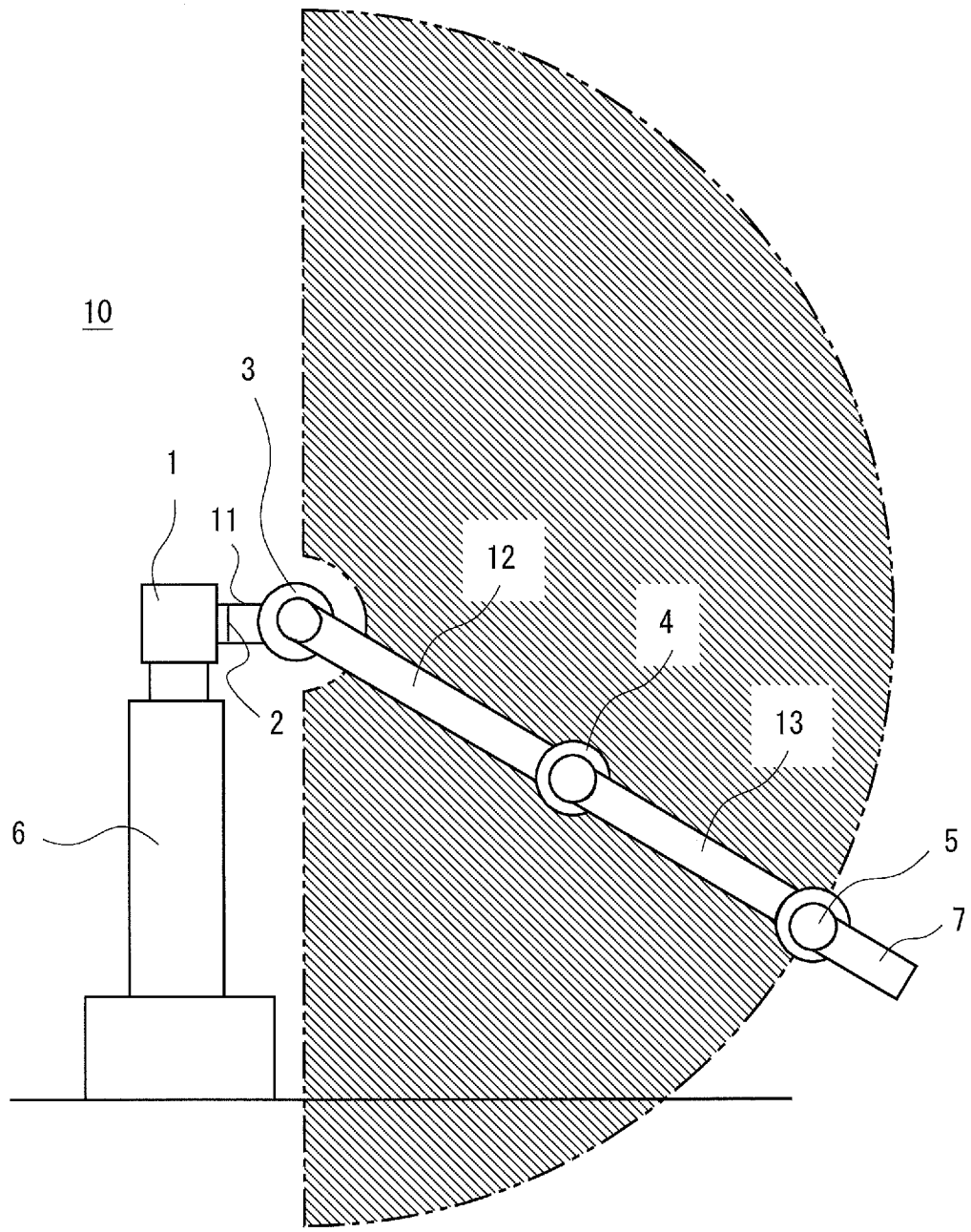
FIG. 9 is a view showing an example of the range of motion of the arm at a low position in the perpendicular mode.

For example, at a low position such as on a floor, the controller 8 switches the arm to the perpendicular mode in the state where the first joint 1 is lowered by the contraction of the support part 6 through the sixth driver 26, and performs work with the end effector part 7 moving lower than the first to third joints (shoulder axes 1 to 3) 1, 2 and 3 (FIG. 9).

Figure 10:
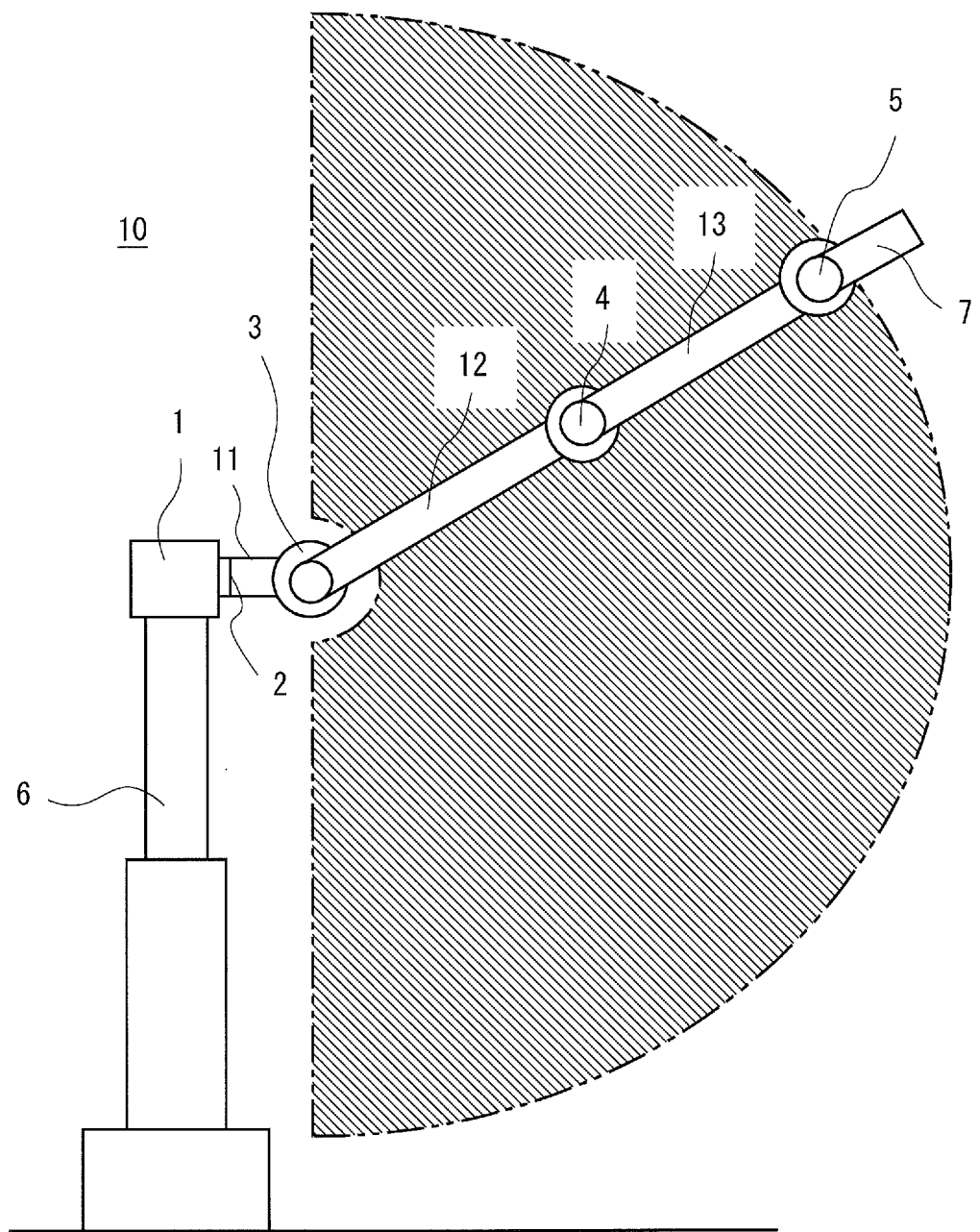
FIG. 10 is a view showing an example of the range of motion of the arm at a high position in the perpendicular mode.
Figure 11:
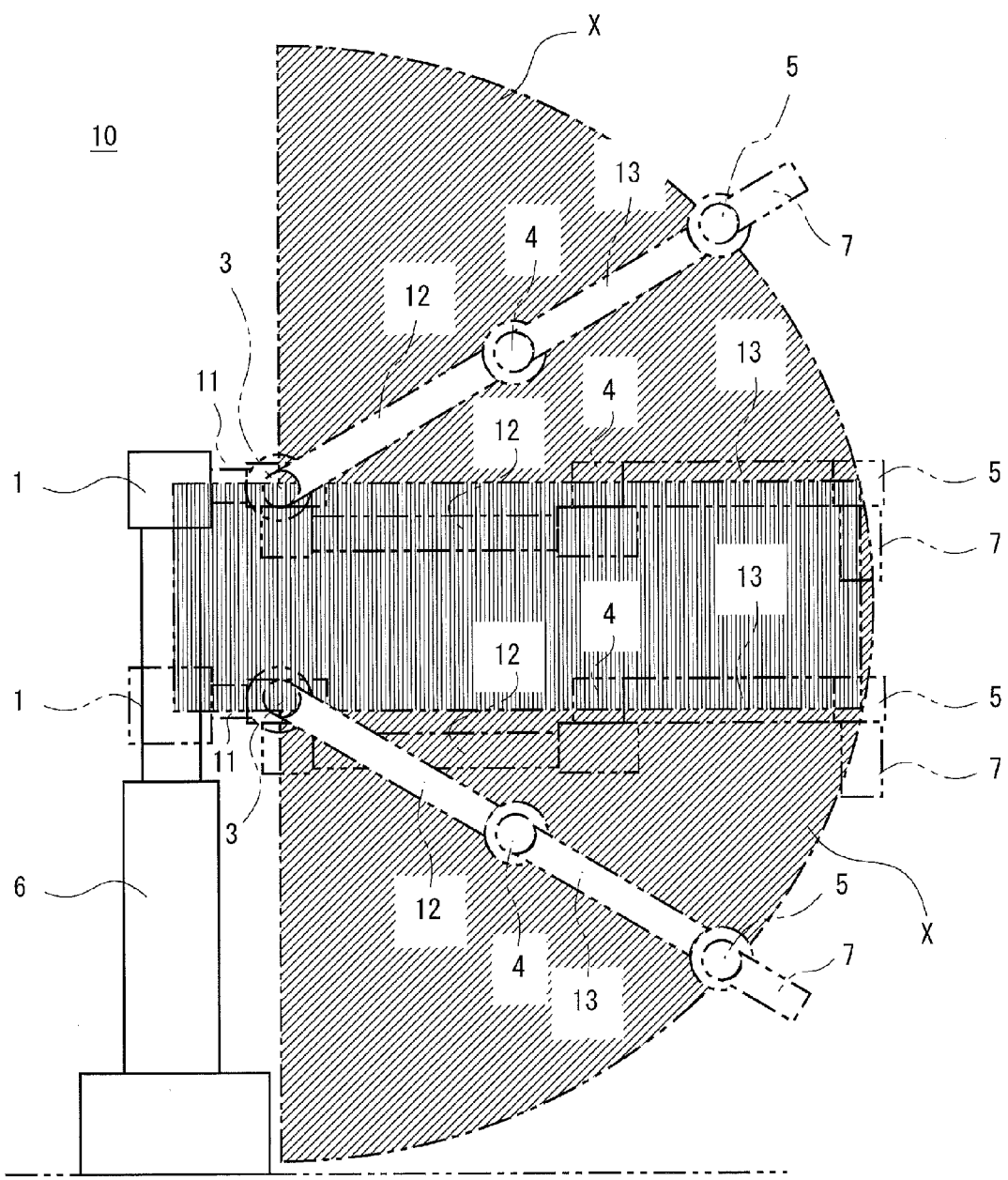
FIG. 11 is a view showing an example of the range of motion of the arm in the SCARA mode and the perpendicular mode.

On the other hand, at a high position such as on a shelf, the controller 8 switches the arm to the perpendicular mode in the state where the first joint 1 is raised by the extension of the support part 6 through the sixth driver 26, and performs work with the end effector part 7 moving higher than the first to third joints (shoulder axes 1 to 3) 1, 2 and 3 (FIG. 10). In this manner, the controller 8 can expand the range of motion of the end effector part 7 to a wide range from a low position to a high position by switching the arm from the SCARA mode to the perpendicular mode (FIG. 11).

Note that, in the perpendicular mode, because the third and fourth joints 3 and 4 rotate about the pitch axes L3 and L4, the load caused by the gravity is likely to act thereon, and the movable weight capacity is lower than that in the SCARA mode. Therefore, work at a low or high position (region X in FIG. 11) is based on the premise that it does not grasp a heavy load exceeding the maximum driving torque. In this manner, the controller 8 can move the arm over a wide range from a low position to a high position to perform work by switching the arm to the perpendicular mode.

Figure 12A:
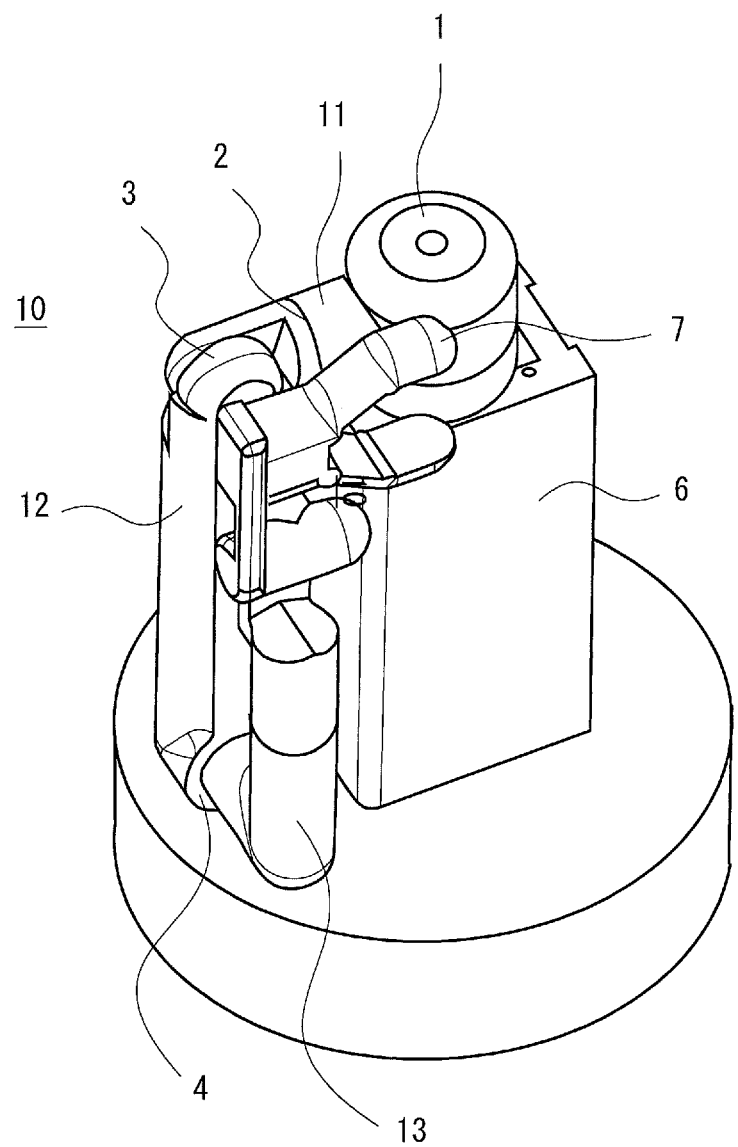
FIG. 12A is a perspective view showing an example of the state where the arm is housed in the perpendicular mode.
Figure 12B:
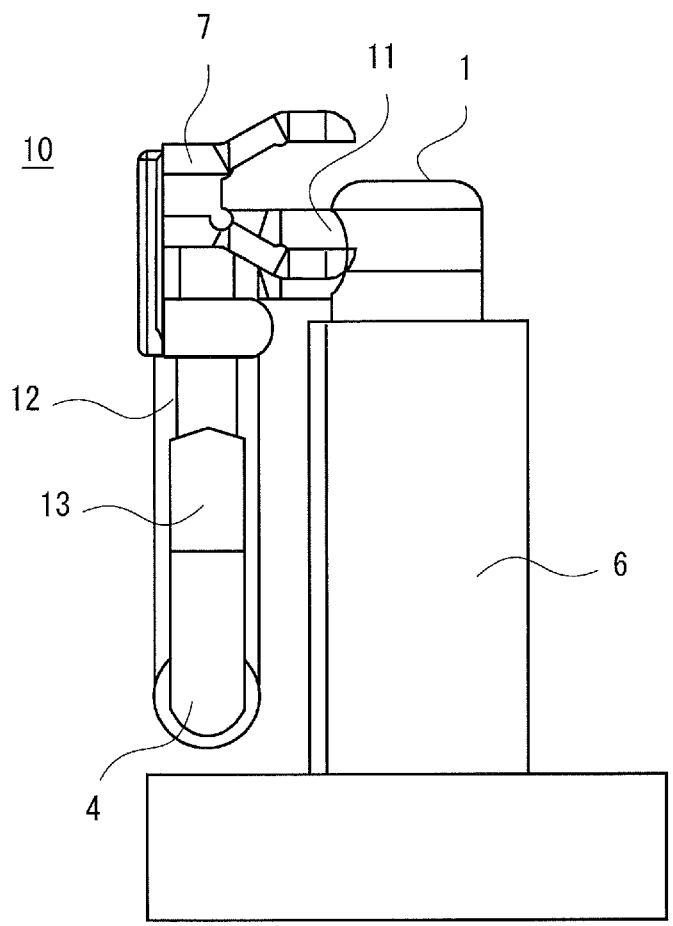
FIG. 12B is a side view showing an example of the state where the arm is housed in the perpendicular mode.

Further, the controller 8 switches the arm to the perpendicular mode, and controls the rotation of the third and fourth joints 3 and 4 so that the second arm part 12, the third arm part 13 and the end effector part 7 are housed (FIGS. 12A and 12B). For example, the controller 8 switches the arm to the perpendicular mode, rotates the third joint 3 so that the second arm part 12 is in the vertically downward orientation, and rotates the fourth joint 4 so that the third arm part 13 in the vertically upward orientation.

The arm can be housed more compactly by the structure in which the second arm part 12 and the third arm part 13 do not interfere with each other when the fourth joint 4 rotates to house the arm as shown in FIGS. 12A and 12B.

In a typical SCARA arm, the second arm part sticks out horizontally from the third joint position by the length of the second arm part or more when the arm is housed, and the footprint (floor projected area) of the entire arm robot is large. On the other hand, in the articulated arm robot 10 according to the first embodiment, the arm is switched to the perpendicular mode and then folded, which makes the footprint in the state where the arm is housed small. In this manner, it is possible to improve the capability of being housed, which has been the disadvantage of the SCARA arm, as well as keeping the advantage of the SCARA arm.

As described above, in the articulated arm robot 10 according to the first embodiment, the controller 8 performs drive control of the first to fourth drivers 21, 22, 23 and 24 of the first to fourth joints 1, 2, 3 and 4 by switching the arm between the SCARA mode in which the first, third and fourth joints 1, 3 and 4 rotate only in the horizontal direction and the perpendicular mode in which the third and fourth joints 3 and 4 rotate only in the perpendicular direction. It is thus possible to drive the arm with a small driving force in the SCARA mode and move the arm over a wide range in the perpendicular mode.

Note that the switching between the SCARA mode and the perpendicular mode can be easily implemented by placing the second joint 2 between the both ends of the first arm part 11 and rotating the second joint 2 about the roll axis L2. It is thus possible to provide the articulated arm robot 10 capable of driving the arm with a small driving force and moving the arm over a wide range in a simple structure.

Second Embodiment

In the articulated arm robot 10 according to a second embodiment of the present invention, the controller 8 controls the rotation of the first, third and fourth joints 1, 3 and 4 by controlling the first, third and fourth drivers 21, 23 and 24 to minimize the torque imposed on the roll axis L2 of the second joint 2 in the SCARA mode. In the SCARA mode, a large torque is likely to act on the roll axis L2 of the second joint 2; however, by minimizing the torque of the second joint 2, the second driver 22 with a small driving force can be employed, which allows the improved safety and lower power consumption of the arm.

Figure 13:
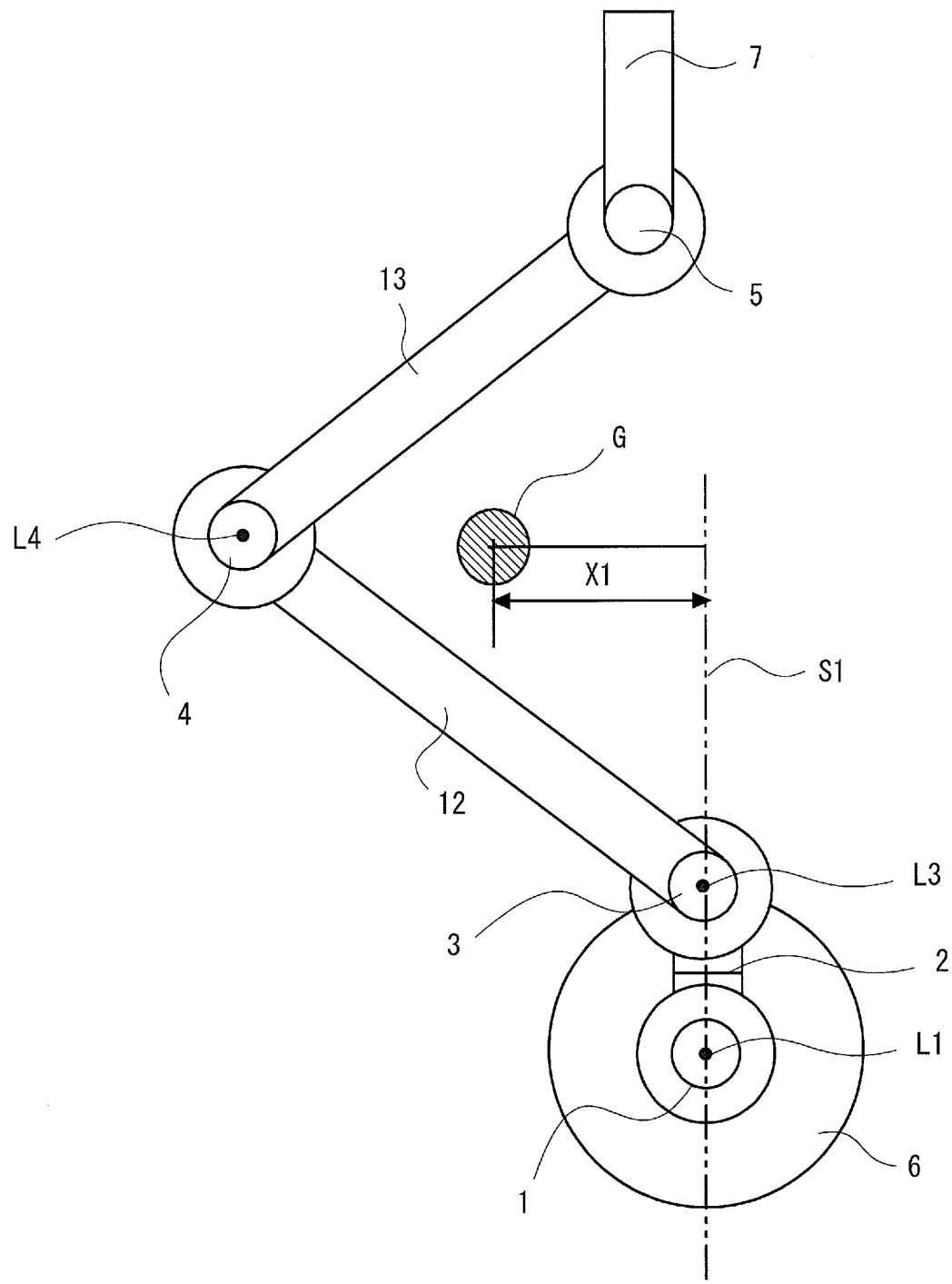
FIG. 13 is a view to explain a method of minimizing a torque on a roll axis of a second joint in the SCARA mode.

For example, the controller 8 controls the rotation of the first, third and fourth joints 1, 3 and 4 by controlling the first, third and fourth drivers 21, 23 and 24 so as to minimize a moment force (moment length X1) by the center of gravity position G of the second joint 2 to the end effector part 7 (FIG. 13).

Figure 14:
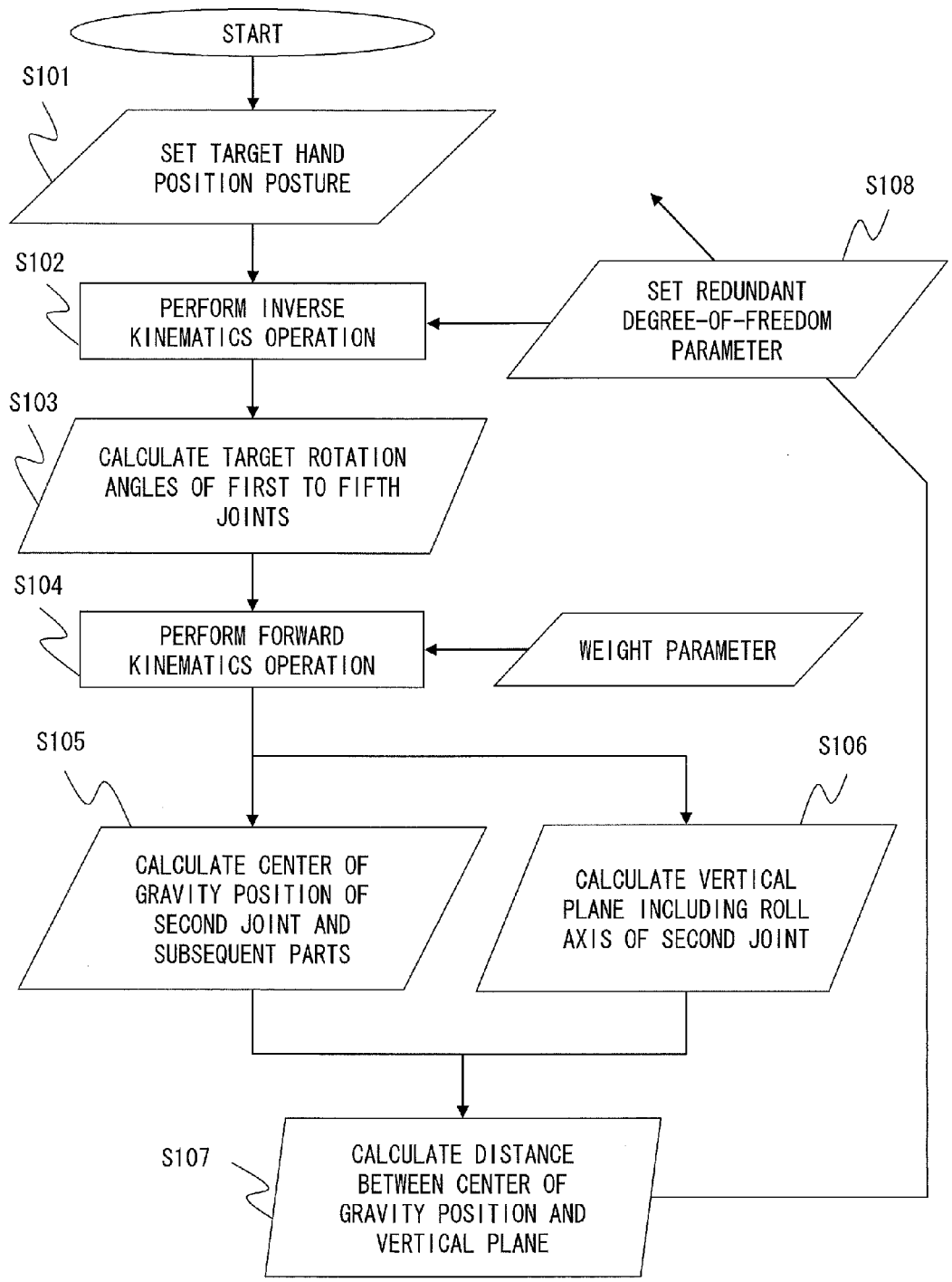
FIG. 14 is a flowchart showing an example of a method of minimizing a torque on the roll axis of the second joint in the SCARA mode.

Next, an example of a method of minimizing the torque imposed on the roll axis L2 of the second joint 2 in the SCARA mode as mentioned above is described in detail. FIG. 14 is a flowchart showing an example of a method of minimizing the torque imposed on the roll axis of the second joint in the SCARA mode according to the second embodiment.

First, the controller 8 sets a target position posture, which is a target hand position posture, of the end effector part 7 (Step S101). Next, the controller 8 performs a known inverse kinematics operation using a redundant degree-of-freedom parameter so that the arm is at the set target hand position posture (Step S102), and calculates target rotation angles of the first to fifth joints 1, 2, 3, 4 and 5 (Step S103).

In the inverse kinematics operation, the rotation angle of the first joint 1 is treated as a constant indicating the redundant degree-of-freedom parameter, for example, and the second joint 2 is fixed in the state of the SCARA mode, and therefore the arm structure according to the second embodiment can be regarded as a six-axis arm, though it is actually an eight-axis arm including the elevation axis, and, assuming that the fifth joint 5 has three orthogonal axes, an analytic solution of the inverse kinematics can be obtained.

After that, the controller 8 performs a known forward kinematics operation based on the preset weight parameters of the first to third arm parts 11, 12 and 13 and the end effector part 7 and the calculated target rotation angles of the first to fifth joints 1, 2, 3, 4 and 5 (Step S104) and calculates the center of gravity position G from the second joint 2 to the end effector part 7 (Step S105).

Then, the controller 8 calculates a vertical plane S1 including the roll axis L2 of the second joint 2 (Step S106). Note that the weight parameters are preset to a ROM 8b or a RAM 8c of the controller 8, for example.

Then, the controller 8 calculates a distance (moment length) X1 between the calculated center of gravity position G from the second joint 2 to the end effector part 7 and the vertical plane 51 including the roll axis L2 of the roll axis L2 (FIG. 13) (Step S107).

The controller 8 changes the redundant degree-of-freedom parameter by a convergence operation such as Newton's method and sets the redundant degree-of-freedom parameter to minimize the distance X1 between the center of gravity position G from the second joint 2 to the end effector part 7 and the vertical plane S1 including the roll axis L2 of the roll axis L2 (Step S108), and then returns to the above (Step S102).

Note that the controller 8 can calculate the center of gravity position G with higher accuracy by modeling the work weight in advance or measuring the work weight after grasping of the work using a load sensor or the like and then modifying the weight parameter.

Further, the controller 8 may minimize the load torque imposed on the roll axis L2 of the second joint 2 in the SCARA mode based on the torque of the roll axis L2 of the second joint 2 measured by a torque sensor or the like. It is thus possible to easily reduce the load torque imposed on the roll axis L2 of the second joint 2 even when it is difficult to directly measure an external force acting on the arm, such as a work weight or a contact force with the environment, using a force sensor or the like.

Figure 15:
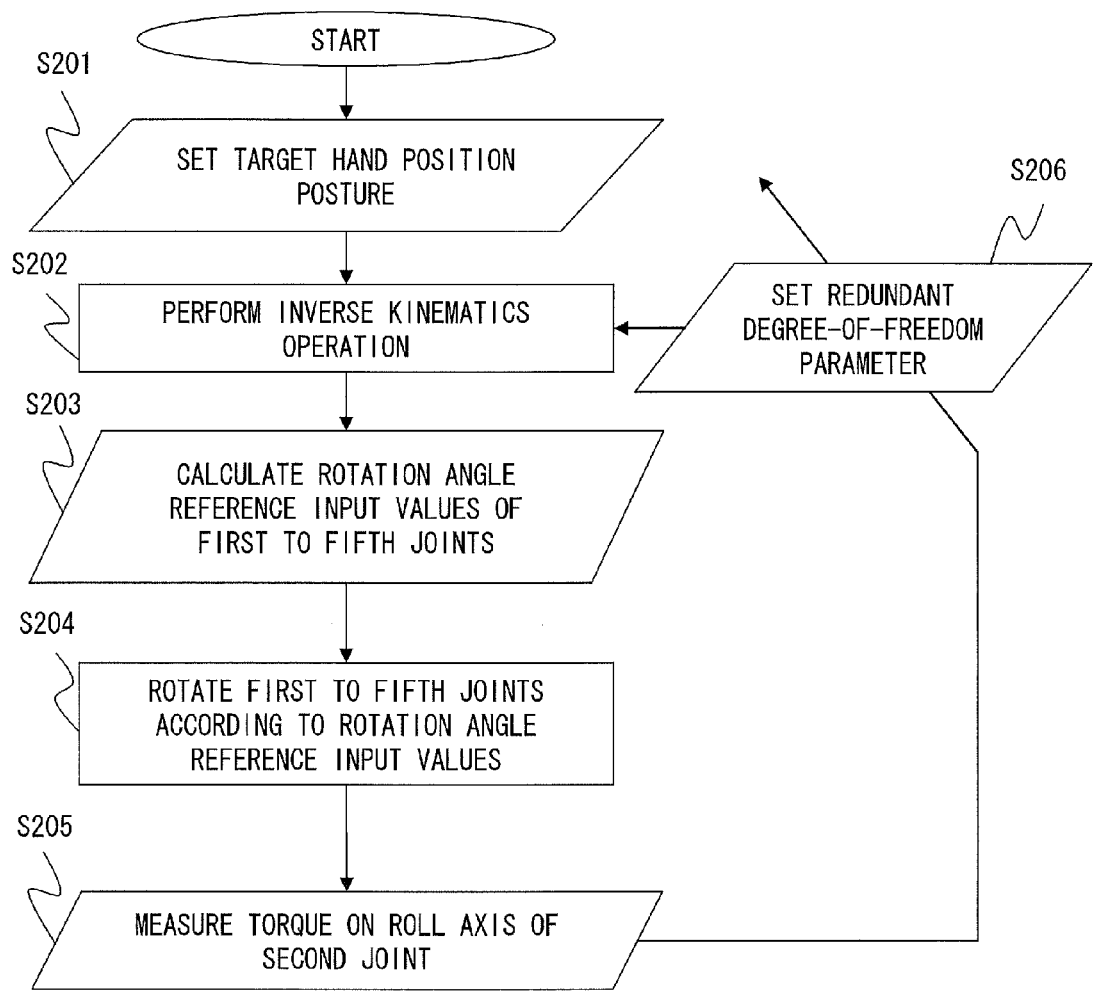
FIG. 15 is a flowchart showing an example of a method of minimizing a torque on the roll axis of the second joint in the SCARA mode.

In this case, as shown in FIG. 15, the controller 8 first sets a target position of the end effector part 7 and thereby sets a target hand position posture (Step S201). Next, the controller 8 performs a known inverse kinematics operation using a redundant degree-of-freedom parameter so that the arm posture becomes the set target hand position posture (Step S202) and calculates rotation angle reference input values of the first to fifth joints 1, 2, 3, 4 and 5 (Step S203).

The controller 8 outputs the calculated rotation angle reference input values of the first to fifth joints 1, 2, 3, 4 and 5 to the first to fifth drivers 21, 22, 23, 24 and 25, and the first to fifth drivers 21, 22, 23, 24 and 25 rotate the first to fifth joints 1, 2, 3, 4 and 5, respectively, according to the rotation angle reference input values of the first to fifth joints 1, 2, 3, 4 and 5 from the controller 8 (Step S204).

A torque sensor of the second joint 2 measures the torque imposed on the roll axis L2 of the second joint 2 (Step S205) and outputs the measured torque to the controller 8.

The controller 8 sets a redundant degree-of-freedom parameter so that the torque imposed on the roll axis L2 of the second joint 2 is small (Step S206) and returns to the above (Step S202). Note that a method of minimizing the torque imposed on the roll axis L2 of the second joint 2 in the SCARA mode is described above, the method is just an example, and any method may be used for calculation.

As described above, in the articulated arm robot 10 according to the second embodiment, although a large torque is likely to act on the second joint 2 at the arm base in the SCARA mode, the controller 8 controls the rotation of the first, third and fourth joints 1, 3 and 4 to minimize the torque imposed on the roll axis L2 of the second joint 2 in the above-described manner. This allows the second driver 22 with a small driving force to be employed, thus achieving the safe and low power consumption arm structure.

Third Embodiment

In the articulated arm robot 10 according to a third embodiment of the present invention, the controller 8 controls the rotation of the third and fourth joints 3 and 4 by controlling the third and fourth drivers 23 and 24 to minimize the torque imposed on the pitch axis L3 of the third joint 3 in the perpendicular mode. In the perpendicular mode, a large torque is likely to act on the third joint 3; however, by minimizing the torque of the third joint 3, the third driver 23 with a small driving force can be employed, which achieves the improved safety and lower power consumption of the arm.

For example, the controller 8 controls the rotation of the third and fourth joints 3 and 4 by controlling the third and fourth drivers 23 and 24 by selecting a solution of the inverse kinematics with a smaller moment force (moment length X2) around the pitch axis L3 of the third joint 3 by the center of gravity position G from the third joint 3 to the end effector part 7.

Figure 16:
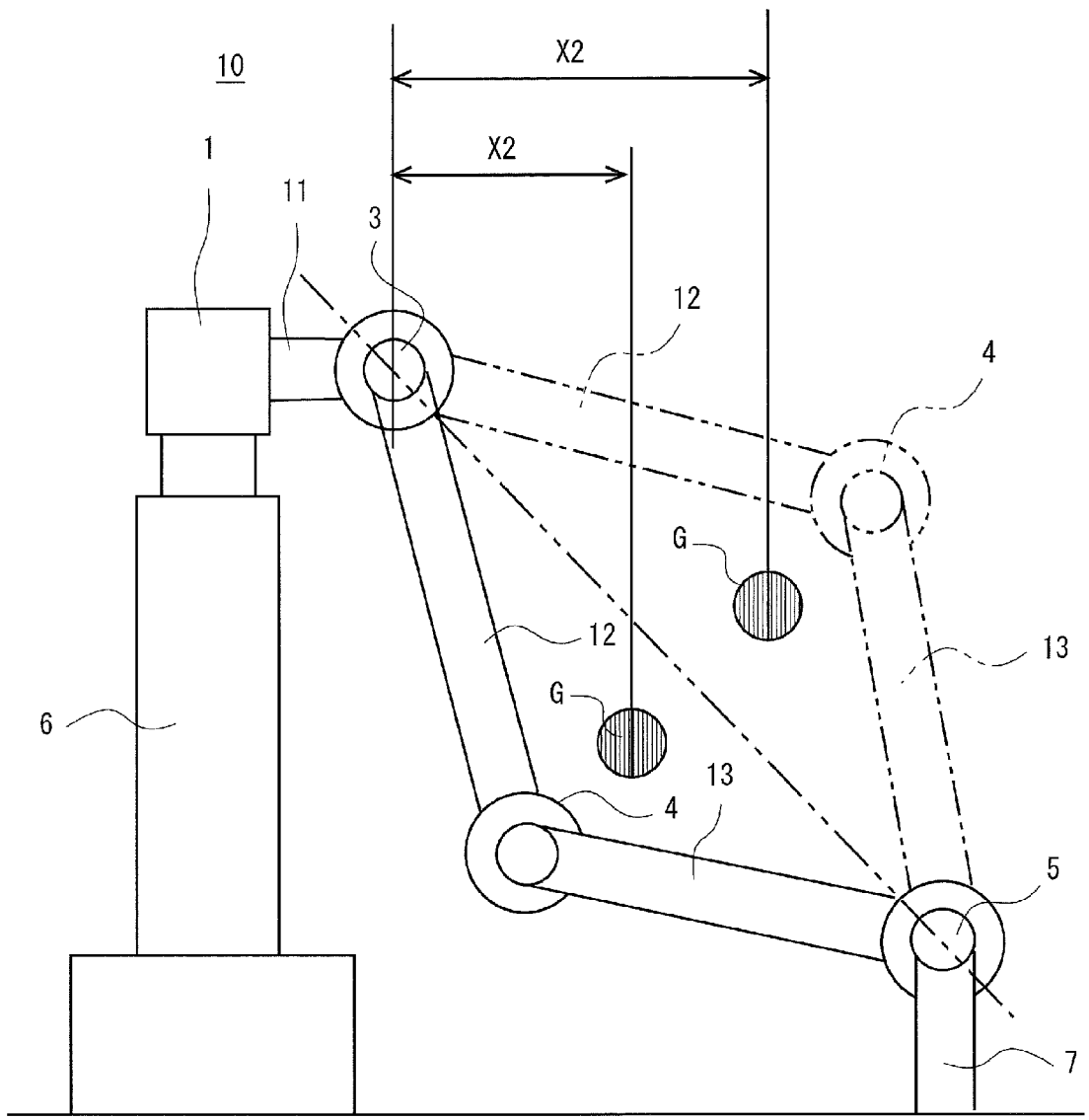
FIG. 16 is a view showing an example of the state where a torque of a pitch axis of a third joint is minimized at a low position in the perpendicular mode.

To be more simple, in the case of a low posture where the third joint 3 is higher than the fourth and fifth joints 4 and 5, the controller 8 controls the rotation of the third and fourth joints 3 and 4 so that the fourth joint 4 is placed lower than a line connecting the third joint 3 and the fifth joint 5 (FIG. 16).

Figure 17:
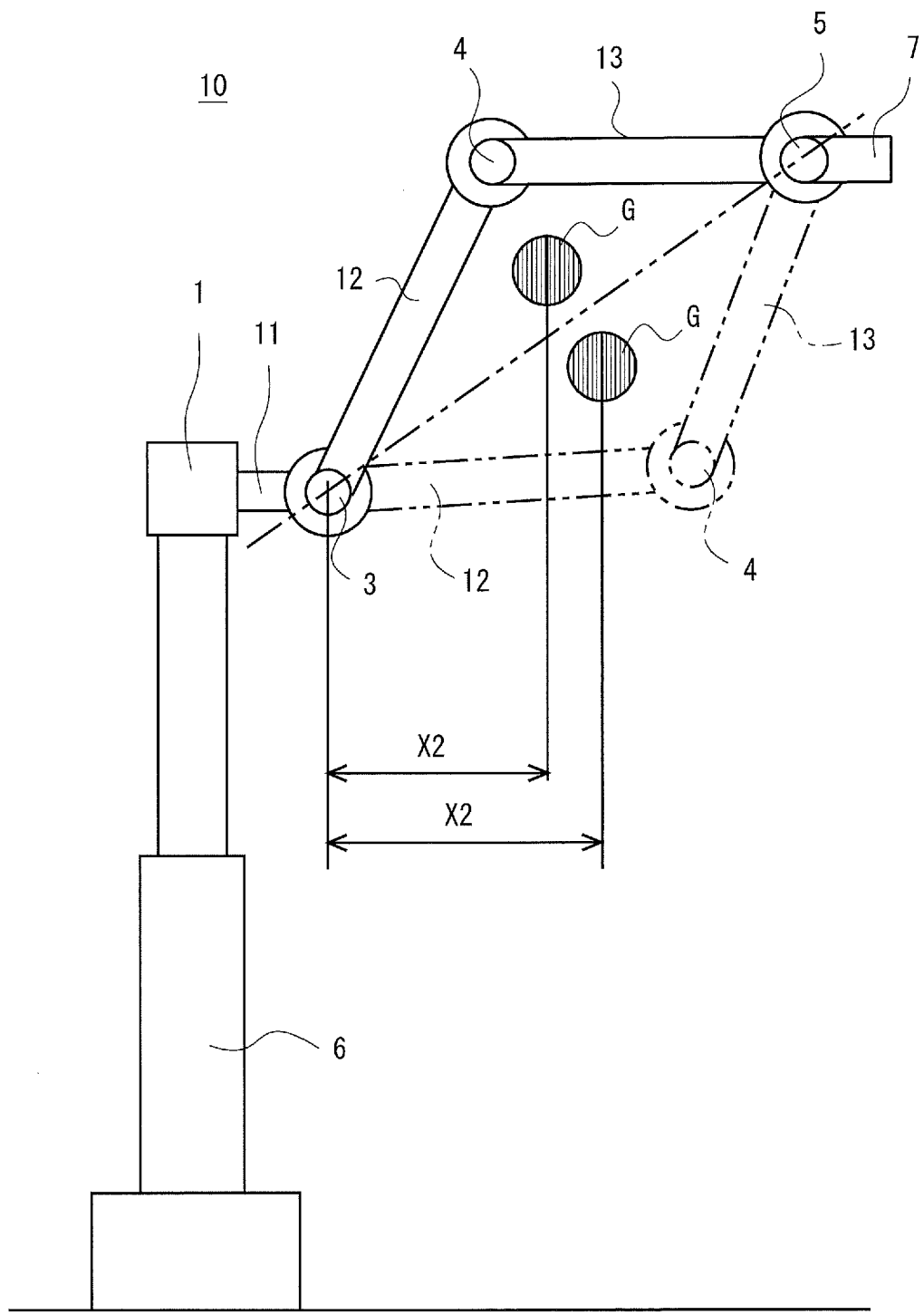
FIG. 17 is a view showing an example of the state where a torque of the pitch axis of the third joint is minimized at a high position in the perpendicular mode.

On the other hand, in the case of a high posture where the third joint 3 is lower than the fourth and fifth joints 4 and 5, the controller 8 controls the rotation of the third and fourth joints 3 and 4 so that the fourth joint 4 is placed higher than the line connecting the third joint 3 and the fifth joint 5 (FIG. 17).

As described above, in the articulated arm robot 10 according to the third embodiment, although a large torque is likely to act on the third joint 3 at the arm base in the perpendicular mode, the controller 8 controls the rotation of the third and fourth joints 3 and 4 to minimize the torque imposed on the pitch axis L3 of the third joint 3 in the above-described manner. This allows the third driver 23 with a small driving force to be employed, thus achieving the safe and low power consumption arm structure.

Fourth Embodiment

In the articulated arm robot 10 according to a fourth embodiment of the present invention, the support part 6 may include a weight compensation mechanism 41 that supports the gravity of the first joint 1 to the end effector part 7. Although a large driving force is required for the extension and contraction of the support part 6 at the arm base, by mounting the weight compensation mechanism 41 on the support part 6, the gravity of the first joint 1 to the end effector part 7 is always supported by the weight compensation mechanism 41, and the support part 6 can thereby extend and contract with the minimum necessary driving force corresponding to a substantial effective work force. This allows the sixth driver 26 with a small driving force to be employed for the extension and contraction of the support part 6, which achieves the improved safety and lower power consumption of the arm.

Figure 18:
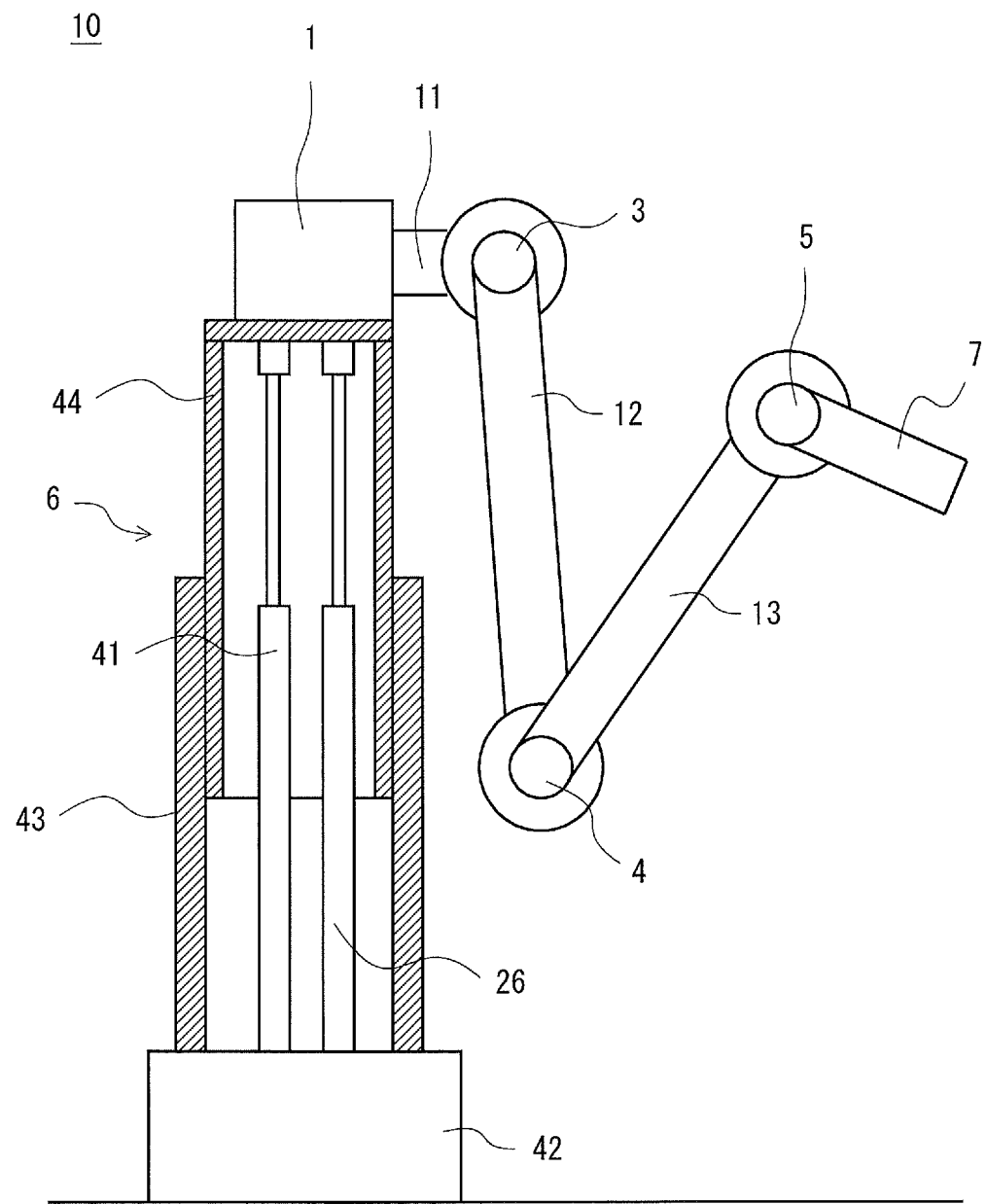
FIG. 18 is a view showing an example of a weight compensation mechanism in the support part according to a fourth embodiment of the present invention.
Figure 19:
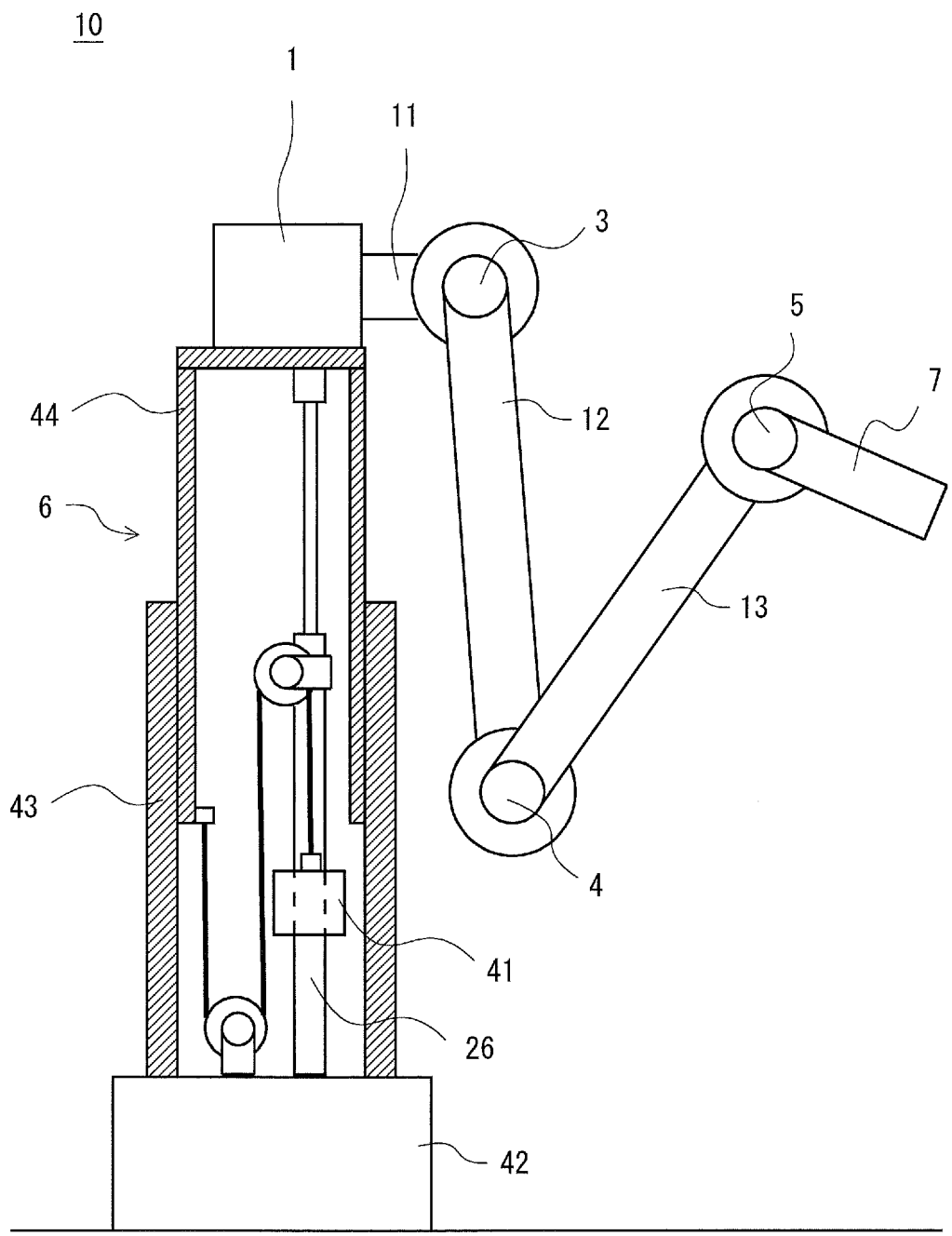
FIG. 19 is a view showing an example of a weight compensation mechanism in the support part according to the fourth embodiment of the present invention.

For example, the support part 6 includes a base 42 fixed to a given position, a lower member 43 fixedly joined to the base 42, and an upper member 44 engaged with the lower member 43 to be movable upward and downward (FIG. 18). In the lower and upper members 43 and 44, a direct-acting actuator (sixth driver) 26 that displaces the upper member 44 up and down relatively to the lower member 43 is mounted along the longitudinal direction. Further, in the lower and upper members 43 and 44, a gas spring (weight compensation mechanism) 41 that urges the upper member 44 upward all the time with the same force as the gravity from the first joint 1 to the end effector part 7 is mounted side by side with the direct-acting actuator 26.

Note that, although a gas spring, for example, is used as the weight compensation mechanism 41, it is not limited thereto, and a structure using a counter weight may be employed, and any mechanism may be used as long as it can support the gravity acting on the first joint 1 to the end effector part 7.

Fifth Embodiment

Figure 20:
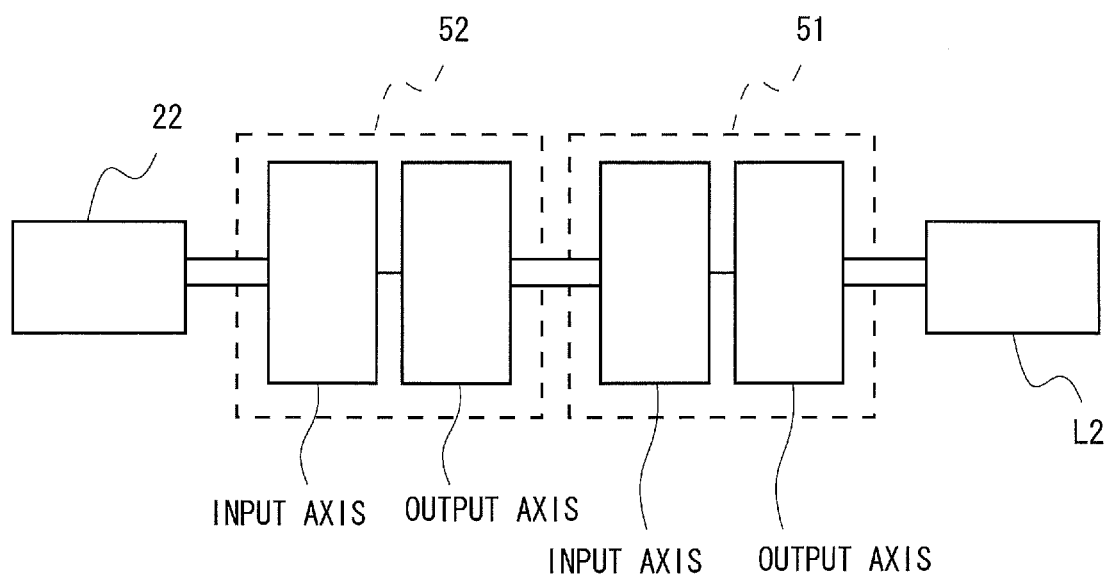
FIG. 20 is a schematic view showing an irreversible transmission mechanism at the second joint according to a fifth embodiment of the present invention.

In the articulated arm robot 10 according to a fifth embodiment of the present invention, an irreversible transmission mechanism 51 that transmits an output torque from the second driver 22 side to the roll axis L2 side of the second joint 2 and does not transmit a torque from the roll axis L2 side of the second joint 2 to the second driver 22 side may be mounted on the second joint 2 (FIG. 20). As the irreversible transmission mechanism 51, a torque diode (registered trademark), a worm gear or the like is used, for example, to prevent reverse driving.

Especially in the SCARA mode, a large torque is likely to act on the second joint 2 at the arm base; however, the roll axis L2 of the second joint 2 serving as the mode switch axis is driven only during the mode switching operation between the SCARA mode and the perpendicular mode. After the mode switching, an external force due to the arm gravity or work from the roll axis L2 of the second joint 2 is held by the irreversible transmission mechanism 51, so that the arm posture after the mode switching can be maintained even in the state without the driving force of the second driver 22. The second driver 22 thus only needs to be able to output a driving force required for the mode switching operation. This allows the second driver 22 with a small driving force to be employed, thus achieving the safe and low power consumption arm structure.

For example, in the second joint 2, an input axis of a speed reducer 52 is joined to an output axis of a servomotor, which is the second driver 22, an input axis of the irreversible transmission mechanism 51 is joined to an output axis of the speed reducer 52, and the roll axis L2 of the second joint 2 is joined to an output axis of the irreversible transmission mechanism 51.

In this structure, even when an external force due to the arm gravity or work from the roll axis L2 of the second joint 2 is generated in the state where the output axis of the second driver 22 does not rotate, the roll axis L2 of the second joint 2 is locked by the irreversible transmission mechanism 51. Thus, the rotation angle of the roll axis L2 of the second joint 2 is kept even when the driving force of the second joint 2 is zero. Note that, in the case where the allowable input number of revolutions of the irreversible transmission mechanism 51 is more than the maximum number of revolutions of the input axis of the speed reducer 52, the sequence of assembly of the speed reducer 52 and the irreversible transmission mechanism 51 may be reversed. Further, although the irreversible transmission mechanism 51 is mounted on the roll axis L2 of the second joint 2 in this example, it may be further mounted on the yaw axis or the pitch axis L3 of the third joint 3 and/or the yaw axis or the pitch axis L4 of the fourth joint 4.

Sixth Embodiment

Figure 21:
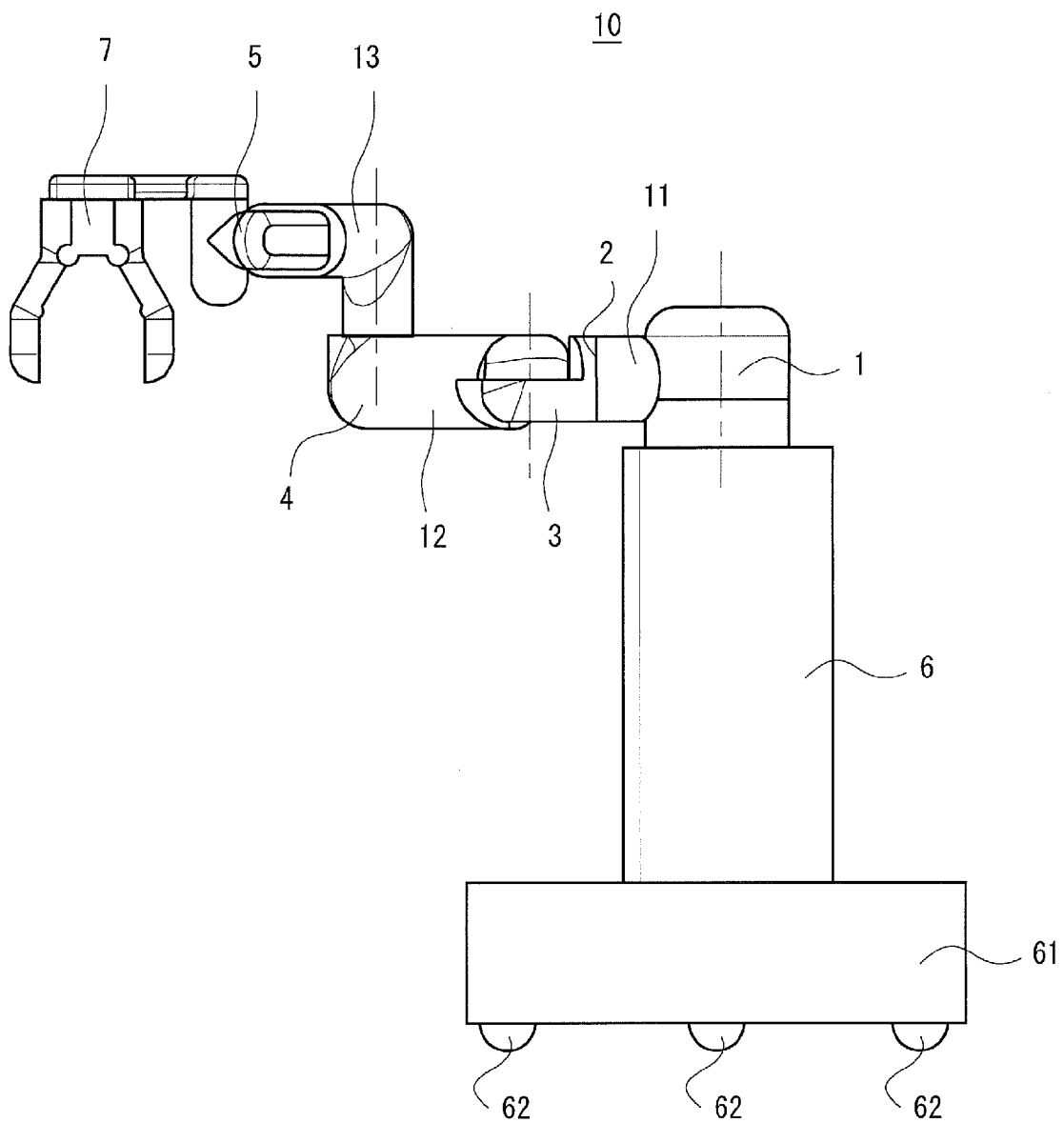
FIG. 21 is a side view showing an example of a movable body joined to the support part according to a sixth embodiment of the present invention.

The articulated arm robot 10 according to a sixth embodiment of the present invention may further include a movable body 61 which is joined to the support part 6 and movable (FIG. 21). Although a bogie 61 with a plurality of wheels 62 is used as the movable body 61, for example, it is not limited thereto, and any structure is applicable.

Thus, even when an object to be grasped and handled is not within the reachable range of the arm such as on a floor, desk or shelf, it is possible to move the movable body 61 to a place where work can be conducted and then handle the object by grasping or the like, thus enabling grasping and handling of an object in a wide range. It is thus possible to drive the arm with a small driving force and move it over a wide range in a simple structure.

Note that the present invention is not limited to the above-described embodiments, and various changes and modifications may be made without departing from the scope of the invention.

Although the present invention is described as being a hardware configuration in the above embodiments, the present invention is not limited thereto. The present invention may be implemented by causing a CPU 8a to execute a computer program to perform the processing of the controller 8.

A program can be stored and provided to a computer using any type of non-transitory computer readable medium. The non-transitory computer readable medium includes any type of tangible storage medium. Examples of the non-transitory computer readable medium include a magnetic storage medium (such as a floppy disk, magnetic tape, hard disk drive, etc.), an optical magnetic storage medium (e.g. a magneto-optical disk), CD-ROM (Read Only Memory), CD-R, CD-R/W, and semiconductor memory (such as mask ROM, PROM (Programmable ROM), EPROM (Erasable PROM), flash ROM, RAM (Random Access Memory), etc.).

Further, the program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or an optical fiber or a wireless communication line.

INDUSTRIAL APPLICABILITY

The present invention is applicable to a robot arm that works together with human and performs work to move a person, object and the like.

REFERENCE SIGNS LIST

1 FIRST JOINT
2 SECOND JOINT
3 THIRD JOINT
4 FOURTH JOINT
5 FIFTH JOINT
6 SUPPORT PART
7 END EFFECTOR PART
8 CONTROLLER
10 ARTICULATED ARM ROBOT
11 FIRST ARM PART
12 SECOND ARM PART
13 THIRD ARM PART
21 FIRST DRIVER
22 SECOND DRIVER
23 THIRD DRIVER
24 FOURTH DRIVER
25 FIFTH DRIVER
26 SIXTH DRIVER

The invention claimed is:

1. An articulated arm robot comprising:
a support part capable of extending and contracting upward and downward,
a first arm part with one end joined to the support part through a first joint to be rotatable about a yaw axis and having a second joint rotatable about a roll axis between both ends,
a second arm part with one end joined to the other end of the first arm part through a third joint to be rotatable about the yaw axis or a pitch axis,
an end effector part joined to the other end of the second arm part through a fourth joint to be rotatable about the yaw axis or the pitch axis,
drivers that respectively cause the first to fourth joints to rotate and the support part to extend and contract, and
a controller that performs drive control of the drivers of the first to fourth joints by switching the arm to a SCARA (Selective Compliance Assembly Robot Arm) mode where the first, second and third arm parts rotate only in a horizontal plane when driving the first, second and third arm parts with a low driving force, and to a perpendicular mode where the second and third arm parts rotate only in a vertical plane when moving the second and third arm parts over a wide range in a vertical direction.

2. The articulated arm robot according to claim 1, wherein the controller controls the arm to switch between the SCARA mode where rotation axes of the first, third and fourth joints are in a vertical direction and the perpendicular mode where rotation axes of the third and fourth joints are in a horizontal direction by controlling the drivers to rotate the second joint about the roll axis.

3. The articulated arm robot according to claim 1, wherein the controller controls rotation of the first, third and fourth joints by controlling the drivers to minimize a torque imposed on the roll axis of the second joint in the SCARA mode.

4. The articulated arm robot according to claim 3, wherein the controller controls rotation of the first, third and fourth joints by controlling the drivers to minimize a moment force acting on the second joint by a center of gravity position from the second joint to the end effector part.

5. The articulated arm robot according to claim 4, wherein the center of gravity position includes a work weight.

6. The articulated arm robot according to claim 1, wherein the controller controls rotation of the third and fourth joints by controlling the drivers to minimize a torque imposed on the pitch axis of the third joint in the perpendicular mode.

7. The articulated arm robot according to claim 6, wherein the controller controls rotation of the third and fourth joints by controlling the drivers to minimize a moment force around the pitch axis of the third joint by a center of gravity position from the third joint to the end effector part.

8. The articulated arm robot according to claim 7, wherein the center of gravity position includes a work weight.

9. The articulated arm robot according to claim 6, wherein
in a low posture where the third joint is higher than the fifth joint, the controller controls rotation of the third and fourth joints so that the fourth joint is placed lower than a line connecting the third joint and the fifth joint, and
in a high posture where the third joint is lower than the fifth joint, the controller controls rotation of the third and fourth joints so that the fourth joint is placed higher than the line connecting the third joint and the fifth joint.

10. The articulated arm robot according to claim 1, further comprising:
a third arm part with one end joined to the other end of the second arm part through a fourth joint to be rotatable about the yaw axis or the pitch axis,
wherein the end effector part is joined to the other end of the third arm part through a fifth joint to be rotatable about the roll axis, the pitch axis and the yaw axis.

11. The articulated arm robot according to claim 10, wherein the controller switches the arm to the perpendicular mode and controls rotation of the third and fourth joints so that the second arm part, the third arm part and the end effector part are housed.

12. The articulated arm robot according to claim 1, wherein an irreversible transmission mechanism that transmits an output torque from the driver side to the roll axis side of the second joint and does not transmit a torque from the roll axis side of the second joint to the driver side is mounted on the second joint.

13. The articulated arm robot according to claim 1, wherein a weight compensation mechanism that supports gravity from the first joint to the end effector part is mounted on the support part.

14. The articulated arm robot according to claim 1, further comprising:
a movable body joined to the support part and being movable.

15. A control method of an articulated arm robot including
a support part capable of extending and contracting upward and downward,
a first arm part with one end joined to the support part through a first joint to be rotatable about a yaw axis and having a second joint rotatable about a roll axis between both ends,
a second arm part with one end joined to the other end of the first arm part through a third joint to be rotatable about the yaw axis or a pitch axis,
an end effector part joined to the other end of the second arm part through a fourth joint to be rotatable about the yaw axis or the pitch axis, and
drivers that respectively cause the first to fourth joints to rotate and the support part to extend and contract,
the method comprising:
performing drive control of the drivers of the first to fourth joints by switching the arm to a SCARA mode where the first, second and third arm parts rotate only in a horizontal plane when driving the first, second and third arm parts with a low driving force, and to a perpendicular mode where the second and third arm parts rotate only in a vertical plane when moving the second and third arm parts over a wide range in a vertical direction.

16. A control program, stored on a non-transitory computer readable medium, of an articulated arm robot including
a support part capable of extending and contracting upward and downward,
a first arm part with one end joined to the support part through a first joint to be rotatable about a yaw axis and having a second joint rotatable about a roll axis between both ends,
a second arm part with one end joined to the other end of the first arm part through a third joint to be rotatable about the yaw axis or a pitch axis,
an end effector part joined to the other end of the second arm part through a fourth joint to be rotatable about the yaw axis or the pitch axis, and
drivers that respectively cause the first to fourth joints to rotate and the support part to extend and contract, the program causing a computer to execute a process comprising:

performing drive control of the drivers of the first to fourth joints by switching the arm to a SCARA mode where the first, second and third arm parts rotate only in a horizontal plane when driving the first, second and third arm parts with a low driving force, and to a perpendicular mode where the second and third arm parts rotate only in a vertical plane when moving the second and third arm parts over a wide range in a vertical direction.

* * * * *